United States Patent
Yang et al.

(10) Patent No.: US 10,915,973 B2
(45) Date of Patent: Feb. 9, 2021

(54) SYSTEM AND METHOD PROVIDING EXPERT AUDIENCE TARGETING

(71) Applicant: TRANSFORM SR BRANDS LLC, Hoffman Estates, IL (US)

(72) Inventors: Jen Hao Yang, Schaumburg, IL (US); Ryan C. Sponseller, Evanston, IL (US); Bharath Sridharan, Hoffman Estates, IL (US); Eui Chung, Huntley, IL (US); Edward S. Lampert, Bay Harbor, FL (US)

(73) Assignee: Transform SR Brands LLC, Hoffman Estates, IL (US)

( * ) Notice: Subject to any disclaimer, the term of this patent is extended or adjusted under 35 U.S.C. 154(b) by 799 days.

(21) Appl. No.: 14/638,256

(22) Filed: Mar. 4, 2015

(65) Prior Publication Data
US 2015/0254785 A1     Sep. 10, 2015

Related U.S. Application Data

(60) Provisional application No. 61/948,533, filed on Mar. 5, 2014.

(51) Int. Cl.
| | |
|---|---|
| *G06Q 50/00* | (2012.01) |
| *G06Q 10/06* | (2012.01) |
| *G06N 7/00* | (2006.01) |
| *G06Q 30/06* | (2012.01) |

(52) U.S. Cl.
CPC ............ *G06Q 50/01* (2013.01); *G06N 7/005* (2013.01); *G06Q 10/063112* (2013.01); *G06Q 30/0613* (2013.01)

(58) Field of Classification Search
CPC ........................... G06N 7/005; G06Q 30/0613
USPC ........................................................... 705/26
See application file for complete search history.

(56) References Cited

U.S. PATENT DOCUMENTS

| | | | |
|---|---|---|---|
| 8,504,418 B1 | 8/2013 | Dimock | |
| 2010/0277611 A1* | 11/2010 | Holt | H04N 5/772 348/231.2 |
| 2014/0040385 A1* | 2/2014 | Hofman | G06Q 10/10 709/206 |
| 2014/0298199 A1* | 10/2014 | Johnson, Jr. | G06Q 10/101 715/753 |
| 2015/0017616 A1* | 1/2015 | Rachitsky | H04W 4/21 434/130 |

OTHER PUBLICATIONS

Figueroa, Alejandro, Carlos Gómez-Pantoja, and Günter Neumann. "Integrating Heterogeneous Sources for Predicting Question Temporal Anchors Across Yahoo! Answers." Information Fusion 50 (2019): 112-25. ProQuest. (Year: 2019).*
European Search Report, Appln No. 15157798.8 dated Jul. 1, 2015 (5 pages).
Dec. 14, 2018 European Patent Office Communication pursuant to Article 94(3) EPC, Application No. 15157798.8, 5 pages.

* cited by examiner

*Primary Examiner* — Marissa Thein
*Assistant Examiner* — Latasha D Ramphal
(74) *Attorney, Agent, or Firm* — McAndrews, Held & Malloy, Ltd.

(57) ABSTRACT

A system and method for directing queries to the most suitable potential responders of an audience selected from a crowd-sourced population from which to request information, based on information such as query content, query context, timing, location, preferred supporting resource(s), and source of the query.

21 Claims, 15 Drawing Sheets

SYSTEM AND METHOD PROVIDING EXPERT AUDIENCE TARGETING

CROSS-REFERENCE TO RELATED APPLICATIONS

The present application makes reference to, claims benefit of, and claims priority to U.S. Provisional Patent Application No. 61/948,533, filed Mar. 5, 2014, which is hereby incorporated herein by reference, in its entirety.

FIELD

Aspects of the disclosure relate to systems and methods that provide informational assistance to users. More specifically, certain aspects of the present disclosure relate to systems and methods for directing queries to the most suitable potential responders of an audience selected from a crowd-sourced population from which to request information, based on information such as query content, query context, timing, location, preferred supporting resource(s), and source of the query.

BACKGROUND

An individual having a question or needing advice about something may ask friends or acquaintances for an answer. Someone in their social network may respond but the individual requesting the answer or advice may end up with little sense of how much faith and confidence to place in the answer or advice, or end up with no responses. Making a public request for help to a broader audience may result in a large number of responses including those of some individuals having valuable and pertinent knowledge, those having little knowledge, and those that provide misleading information. Responders may be unfamiliar with the subject matter, the situation, or have insufficient information. The individual with the question is left to identify, from the mass of responses, those that are of real value.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and method that automatically directs queries to the most suitable potential responders selected from a crowd-sourced population, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
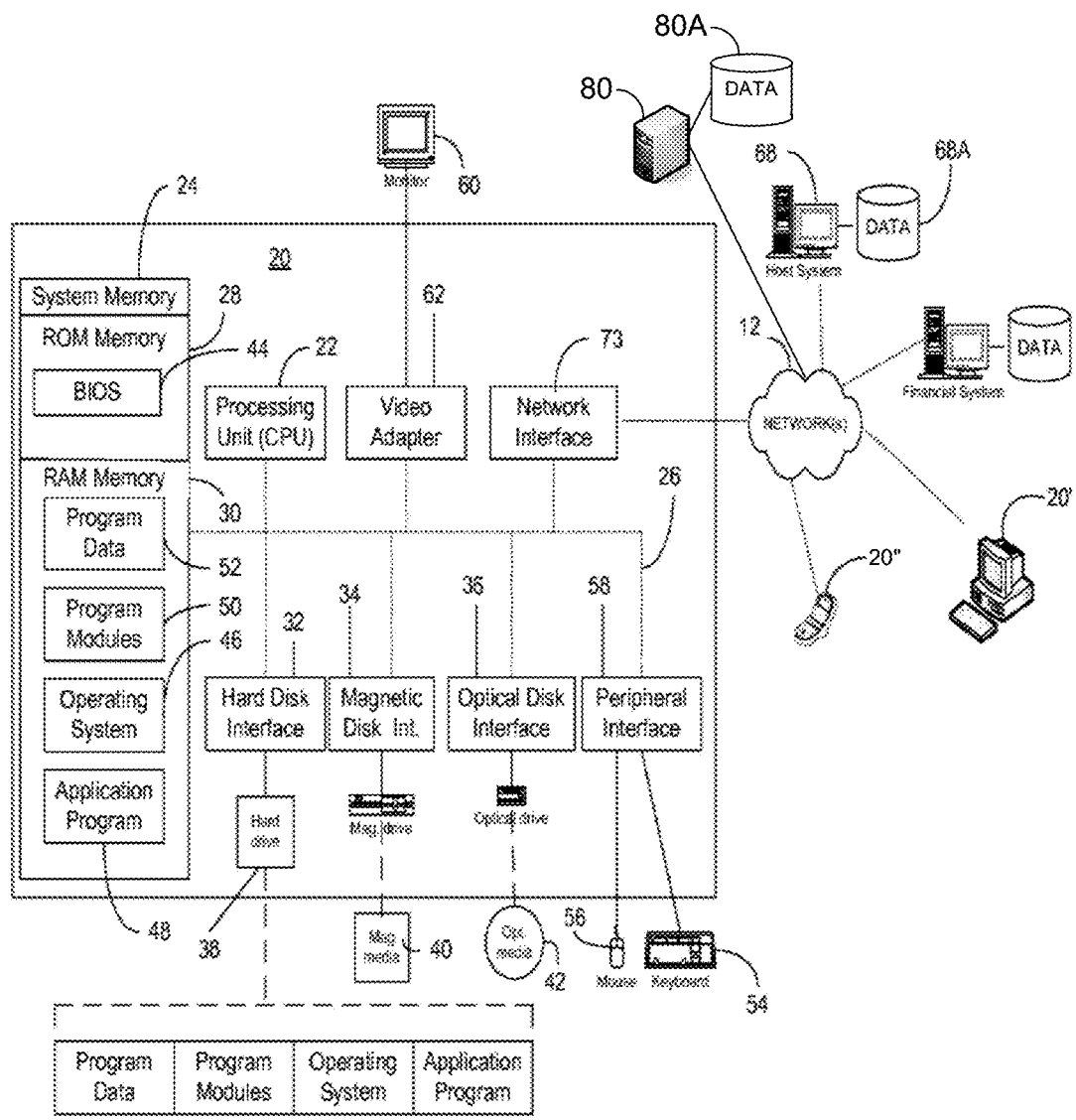
FIG. 1 is an illustration of computer network, in which a representative embodiment of the present disclosure may be practiced.

Aspects of the present disclosure relate to systems and methods that provide informational assistance to users. More specifically, certain aspects of the present disclosure relate to systems and methods that automatically direct queries to the most suitable potential responders of an audience selected from a crowd-sourced population from which to request information, based on information such as query content, query context, timing, location, preferred supporting resource(s), and source of the query.

The following description of example methods and apparatus is not intended to limit the scope of the description to the precise form or forms detailed herein. Instead the following description is intended to be illustrative so that others may follow its teachings.

The terms "merchant" and "sponsoring merchant/merchants" may be used herein to refer to the owner and/or operator of a business enterprise that operates either or both of traditional "brick-and-mortar" business locations or an e-commerce or social e-commerce platform as described herein, or enters into an agreement with another to operate such a platform on their behalf.

In the following discussion, the terms "customer service agent" and "sales associate" may be used herein interchangeably to refer to an employee or other individual who provides product and/or sales related assistance to customers of a business. The sales associate or customer service agent may be, by way of example and not limitation, an expert, question and answer provider, merchandise associate, etc.

The terms "customer," "consumer," "end-user," and "user" may be used herein interchangeably to refer to a potential or existing purchaser of products and/or services of a merchant or business.

The term "personal shopper" may be used herein to refer to an individual that is a member of a merchant loyalty program, that may be highly knowledgeable about various products and services of the merchant, and that has been selected by a merchant to act as a non-employee source of product information and recommendations to other members of the loyalty program.

The term "loyalty program" may be used herein to refer to a structured marketing effort that rewards, and therefore encourages, loyal buying behavior that is potentially beneficial to the business or firm operating or sponsoring the loyalty program. The term "member" may be used herein to refer to those consumers that have provided personal information to an operator or sponsor of a loyalty program in order to gain access to benefits provided by the loyalty program.

The term "social network" may be used herein to refer to a network of family, friends, colleagues, and other personal contacts, or to an online community of such individuals who use a website or other technologies to communicate with each other, share information, resources, etc. The term "social graph" may be used herein to refer to a representation of the personal relationships or connections between individuals in a population.

The term "follow" may be used herein to refer to a user request to be kept informed about a particular person, place, or thing.

The term "share" may be used herein to refer to a user request to communicate information about what is being viewed by a user to members of the user's family, friends, or social network.

The term "tag" may be used herein to refer to a label (e.g., a string of characters) attached to or associated with someone or something for the purpose of identification or to give other information (e.g., characteristics of the person or thing, category to which the person or thing belongs, a relationship to other persons or things).

The term "e-commerce" may be used herein to refer to business or commerce that is transacted electronically, as over the Internet.

The term "social e-commerce" may be used herein to refer to e-commerce in which consumers interact with other consumers socially as part of e-commerce activities. Merchants or businesses may take part in social e-commerce by engaging consumers in various activities including, by way of example and not limitation, email messaging, text messaging, games, and posting or monitoring of activities and information exchanged on social networking platforms (e.g., Facebook®) and/or merchant supported social networks.

The term "crowdsourcing" may be may be used herein to refer to the practice of obtaining needed services, ideas, or content by soliciting contributions from a large group of people. The terms "crowdsource" and "crowdsource population" may be used herein to refer to a large group of people from which contributions of services, ideas, or content may be solicited.

As utilized herein, the terms "exemplary" or "example" means serving as a non-limiting example, instance, or illustration. As utilized herein, the term "e.g." introduces a list of one or more non-limiting examples, instances, or illustrations.

The disclosed methods and systems may be part of an overall shopping experience system created to enhance the consumer shopping event. For example, the disclosed system may be integrated with the customer's reward system, the customer's social network (e.g., the customer can post their shopping activity conducted through the system to their social network), the customer's expert system, digital/mobile applications, shopping history, wish list, location, merchandise selections, or the like. However, the system disclosed may be fully and/or partially integrated with any suitable shopping system as desired, including those not mentioned and/or later designed.

FIG. 1 is an illustration of exemplary computer network in which a representative embodiment of the present disclosure may be practiced. The following discloses various example systems and methods for, by way of example and not limitation, directing queries to the most suitable potential responders of an audience selected from a crowdsourced population from which to request information, based on information such as query content, query context, and source of the query. Referring now to FIG. 1, a processing device 20", illustrated in the exemplary form of a mobile communication device, a processing device 20', illustrated in the exemplary form of a computer system, and a processing device 20 illustrated in schematic form, are shown. Each of these devices 20, 20', 20" are provided with executable instructions to, for example, provide a means for a customer, e.g., a user, a customer or consumer, etc., or a sales associate, a customer service agent, and/or others to access a host system 68 and, among other things, be connected to a content management system, an electronic publication system, a hosted social networking site, a user profile, a store directory, and/or a sales associate. Generally, the computer executable instructions reside in program modules which may include routines, programs, objects, components, data structures, etc. that perform particular tasks or implement particular abstract data types. Accordingly, the processing devices 20, 20', 20" illustrated in FIG. 1 may be embodied in any device having the ability to execute instructions such as, by way of example, a personal computer, mainframe computer, personal-digital assistant ("FDA"), cellular telephone, tablet computer, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36.

As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system 68 having associated data repository 68A. In this regard, while the host system 68 has been illustrated in the exemplary form of a computer, the host system 68 may, like processing device 20, be any type of device having processing capabilities. Again, the host system 68 need not be implemented as a single device but may be implemented in a manner such that the tasks performed by the host system 68 are distributed amongst a plurality of processing devices/databases located at different geographical locations and linked through a communication network. Additionally, the host system 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, media content providers, document storage systems, etc.

For performing tasks as needed, the host system 68 may include many or all of the elements described above relative to the processing device 20. In addition, the host system 68 would generally include executable instructions for, among other things, coordinating storage and retrieval of documents; maintaining social network storage of a shopping list; receiving a location of a customer via a mobile device; maintaining maps and layouts of buildings and geographic areas; calculating directions or routes within buildings and geographic areas; searching, retrieving, and analyzing web-based content; managing operating rules and communication with user devices used by participants in a multiplayer consumer game, for receiving a request for a service call center connection from either a customer or a sales associate; routing a received request via a distributed mobile video call center; receiving questions from individuals seeking information, distributing the questions to a targeted audience, and returning suitable answers to the requestor; and providing a service call infrastructure for providing the requestor with a distributed customer service experience.

Communications between the processing device 20 and the host system 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory computer-readable memory storage device(s) of the host system 68 and processing devices 20, 20' and 20".

A representative embodiment of the present disclosure leverages the knowledge and experience of what may be referred to herein as "support resources" comprising a large number of individuals, to provide the most relevant, accurate, and helpful and, therefore, the most valuable answers to a given question in a focused manner. The ability to provide suitable answers to questions that may be asked is limited only by the knowledge of the "support resources" that are available to participate as part of a "target audience" to which the question is distributed, and may be of any nature on any subject. The individuals participating as the "support resource" for answering any given question may comprise, by way of example and not limitation, selected or volunteer employees of a retail business, selected or volunteer members of a merchant loyalty program, what may be referred to herein as "personal shoppers," various members of the customer support and/or engineering staff of a manufacturer, certain members of a social network, all of the employees of a corporation or enterprise, a professional organization or network of specialists or general practitioners, lawyers, engineers, scientists, historians, members of the press or other media, artists, or any other suitable combination of individuals possessing knowledge and/or experience of use to others. The received questions may be analyzed using, by way of example and not limitation, the question content (e.g., using keyword and/or natural language analysis of the question title and description), the context of the question (e.g., user or system applied tags, the source of the question, the web page or mobile app screen through which the questions was submitted), and the entity responsible for submitting the question (e.g., a profile of the individual that submitted the question, the geographic location of the individual that submitted the questions (e.g., using Internet-based (e.g., HTML5 geo-location API) or GPS-based location information), and past usage of the system by the individual that submitted the question).

In an embodiment in accordance with the present disclosure, relevant questions may be identified for crowd broadcasting, and a proper audience to whom the question(s) are to be distributed, also referred to herein as a "target audience," may be determined. The target audience may comprise various individuals or groups of individuals that may be referred to herein as "support resources." Tags associated with a question by the individual submitting the question, by the operator of the system, or by automated techniques, may be used to aid in selecting the individuals to which the question is distributed. A crowd-matching algorithm may be used to determine the smallest audience to whom the question should be broadcast in order to provide an acceptable level of answer quality and quantity. Previous question analysis may be used to formulate the definition of answer quality. For example, depending upon the context of a question, a system in accordance with a representative embodiment of the present disclosure may consider answers received from resource(s) local to the geographic location of the user from which the question is received to be more valuable than answers received from more geographically distant resource(s).

Once a target audience has been identified that matches an acceptable quality level, the question to be distributed may be broadcast to the target audience. The supporting resources and experts that make up the target audience are then presented with the question and may provide a relevant answer if they are available and choose to respond. Based on the support resources that respond, an estimate of what may be referred to herein as "answer performance" or "answer quality" may be calculated. If answer performance is less than acceptable, the target audience may be expanded, to increase the likelihood of acceptable answer performance.

A representative embodiment of the present disclosure may capitalize on the great information sharing, and cross-location and cross-organization hierarchy communication that may enable within a corporate environment, in which tens of thousands of professional associates may provide those needing answers with quick, diverse, and high quality feedback via a crowd sourcing approach. A representative embodiment of the present disclosure may be employed to provide a unified and consistent means of entry for individuals to ask questions and to get help from support resources in appropriate supporting team(s) directly, without experiencing the hassle of trying to find the right contact info from a list of web pages, toll free numbers, or web forms, or to experience lengthy waits on the phone and be transferred multiple times.

A representative embodiment of the present disclosure may present a simplified experience to both those asking, and those answering questions. Individuals may simply ask their question(s) using a unified user interface, and an appropriate target audience will automatically be determined. Support resources may view a condensed list of questions and may receive notifications about questions on subjects for which they have a high probability of providing an answer. Neither the individual that submits a question, nor the individuals in the target audience selected from the support resources need to take any action(s) to engage friends, follow topics, or join groups. The complexity of finding individuals able to provide relevant, accurate, and high-value answers to various questions is handled automatically by a system in accordance with a representative embodiment of the present disclosure.

A representative embodiment of the present disclosure may be used to mobilize an entire workforce of an organization to answer questions of varied scope and expertise level. For example, a very specific question about inventory may be asked of support resources in stores within a 50 miles radius, or the entire workforce of the organization may be leveraged to provide answers that require a large number of opinions. By employing a representative embodiment of the present disclosure, a supporting resource need not bombarded with all questions or bored by questions that are irrelevant to them, but may instead be presented with opportunities to provide value in what could be a lower productivity period in their daily activities.

In a representative embodiment of the present disclosure, an individual may easily get help using a mobile application (i.e. "app") or a web-based application by simply entering a question. The question may comprise text, one or more images, and/or video content. Personal information about the individual such as, by way of example and not limitation, a personal profile, personal interests, and browsing history, may also be included with the question to aid in identifying appropriate supporting resources to be used in providing an answer. Using a unified and consistent mobile or web user interface, individuals are able to get various kind of help, and are able to avoid the need to visit multiple pages to search for customer service phone number, website information, or email information.

In a representative embodiment according to the present disclosure, support resources from which the target audience is selected may be of various kinds including, by way of example and not limitation, ordinary users of the system, ordinary users with advanced experience or knowledge in one or more areas, and professionals or experts in various areas from corporations and other organizations, which may be referred to herein as an "expert specialty group" (ESG). A collection of individuals that may be referred to herein as an ESG may be created by any user of the computer network (e.g., any individual member, corporate member, or those associated with the organization operating or sponsoring the system such as, for example, the computer network 100 of FIG. 1), on which an embodiment of the present disclosure may be installed. Each ESG may be associated with one or more "tags," which may be added by a system in accordance with the present disclosure, as an element of the context of questions received from users. Individuals, groups, or organizations wishing to join or form an ESG may need approval from a service administrator. Individuals, groups, or organizations may apply to become a member of an ESG, or may be invited to join, based on the their history of interactions with other users of a computer network platform supporting a representative embodiment of the present disclosure. For example, a system in accordance with the present disclosure may be supported and available on, for example, a computer network supporting a social e-commerce network, such as the exemplary computer network 100 shown in of FIG. 1.

In a representative embodiment of the present disclosure, an invitation to an individual to join one or more ESGs may be based on, by way of example and not limitation, the answers that the individual has submitted in response to questions from other users on the computer network. For example, an invitation to join an ESG may be offered to an individual that provides high quality answers such as, for example, answers that receive positive votes or responses from other users of the computer network, and/or may be offered based on a demonstrated history of the individual following related articles, following related products, writing high quality product reviews, posting well-liked and/or highly sought out do-it-yourself (DIY) projects, and following and voting for related questions and answers. After joining an ESG, a "badge" may be added to the user profile of the member, which may be shown on various media including, by way of example and not limitation, web pages and activity cards. Members of ESGs may be enabled to manage and share a personal profile including, by way of example and not limitation, their name, a photo of the member, various historical information including their service history (e.g., their performance), their location, and their interests in products, celebrities, and other users.

As mentioned previously, the ESGs of a representative embodiment of the present disclosure may each be assigned one or more tags, and every interest topic, and tangible and intangible object may be added to the system with one or more tags. In addition, based on the question asked by a user, one or more tags related to the question may be added as metadata to the question by, for example, the user that submitted the question, by other users, by support resources such as, for example, the ESGs, and/or by an automatic tagging service, which will be described in greater detail, below. In a representative embodiment in accordance with the present disclosure, the question may be distributed to the targeted audience (e.g., to selected members of the support resources such as ESG(s)), and to others, based on the tags associated with the question.

A representative embodiment of the present disclosure may select the target audience (e.g., the support resources) to which a question is distributed based on a geographic location of the user that submitted the question. For example, the question may be distributed to members of an ESG in the same physical location or region as the user that submitted the question, to members of an ESG located in or associated with an area of interest to the user, or to members having knowledge of an area identified in the question, based on the location information for the user that submitted a question. In some representative embodiments in accordance with the present disclosure, geo-location information acquired by a user device such as, by way of example and not limitation, global positioning system (GPS) receiver circuitry, wireless local area network (WLAN) circuitry, or other geo-location means of a smart phone; a media player; an e-reader; or a tablet, laptop, or notebook computer, or other suitable electronic device may be included, possibly with additional metadata, with the question submitted by the user. In addition, a user may specify a preferred location in a service setting, a personal profile setting, or use a hash (#) tag as part of the body of the question being submitted.

In order to provide the highest possible level of quality in the answers provided to those submitting questions, a representative embodiment of the present disclosure may employ a number of approaches. For example, answers submitted by the members of the support resources that are part of the target audience may be made available, along with the related question, to both members of the target audience, as well as non-targeted members of the computer network, for review and voting. Such review and voting on the quality of answers to previously submitted questions provides useful information in determining the quality of the answers produced by the support resources, and in determining the anticipated quality of future answers produced by particular support resources if chosen to be a part of the target audience selected to answer questions received in the future. The voting on answers also enables a ranking of existing answers to be provided to a user that submits a question of a similar nature at a later time. Such voting may, by way of example and not limitation, be in the form of user selection of one to five "stars," a numeric value (e.g., "X" out of 100), or a simple selection of one icon for a "more satisfactory" answer and of a different icon for a "less satisfactory" answer.

A representative embodiment in accordance with the present disclosure may determine whether one or more answers to a submitted question already exist in the system, and may present such answers to the support resource for consideration. Such answers may be accompanied by an indication of the quality of each answer, derived from voting, as described above. In such a situation, the support resource considering their answer to a question may choose to re-write an existing answer, to keep the original answer unchanged, or to vote for a particular answer from the pool of existing answers. The votes given to various answers in the pool of existing answers may be used to order the answers when they are presented to the individual that submitted the questions, or may be shown in association with each answer when multiple answers are available, to provide an indication to the viewer of the feelings of the members of the support resource about the quality of the answers. A system in accordance with the present disclosure may also include a "low quality answer filter." For example, if an answer from a pool of previously submitted answer contains one of a set of inappropriate keywords, or if the answer is sufficiently similar to an answer with at least pre-defined number threshold of negative votes, the member of the support resource may no be allowed to post the answer, but may be prompted to re-write the answer, or to register their vote for the best answer in the existing answer pool.

A representative embodiment of the present disclosure may include one or more analytics that track service trends and service improvements. For example, based on the topics of questions, the tags associated with questions by users, the volume of answers, the geographic location of those submitting questions, the geographic location of the support resources answering questions (e.g., the members of a social e-commerce network, subject matter experts), a computer network platform in accordance with the present disclosure may generate trend information identifying ongoing topics based on time, location, applications, products, public figures or celebrities, or any attribute of the computer network platform. Such trend information may help individuals and corporations to make better personal/business decisions or make improvements in applications and/or services, or to provide users with latest trends about an existing or future product, brand, another user, a celebrity, a hot topic, or a real-world event.

A system in accordance with the present disclosure may support the use of a variety of communication mechanisms for use in sending questions to the support resources of the target audience, and for notifying the individuals in the target audience of the receipt or availability of a question awaiting an answer. For example, members of the target audience may be contacted using, by way of example and not limitation, real-time push notification for communication over the Internet to a web-base application or web browser running on a desktop or laptop computer, or to a mobile application ("app") running on a smart phone or a tablet computer. The target audience may also be contacted using, for example, email communication, communication using a social network such as Twitter, short message service (SMS) text messaging, multimedia messaging service (MMS) messaging, or any other suitable form of communication capable of notifying the members of the target audience of the availability of a request for help with an answer to a user question. The same methods of communication may be used by the members of the target audience to access information needed to formulate an answer, and to respond to the individual that sent the request for information. For example, targeted members of the any of the support resources may use a computer network platform such as the exemplary computer network platform 100 of FIG. 1 of the present disclosure, to access and review existing resources on the computer network platform and accessible public and private networks to identify, by way of example and not limitation, product information, do-it-yourself projects, topical poll results, publically accessible news articles, product reviews, catalogs, advertisements, manufacturer information, celebrity information, and the like. Such access to a wide variety of information resources may prove valuable in providing the highest answer quality to the user submitting the question.

Figure 2A:
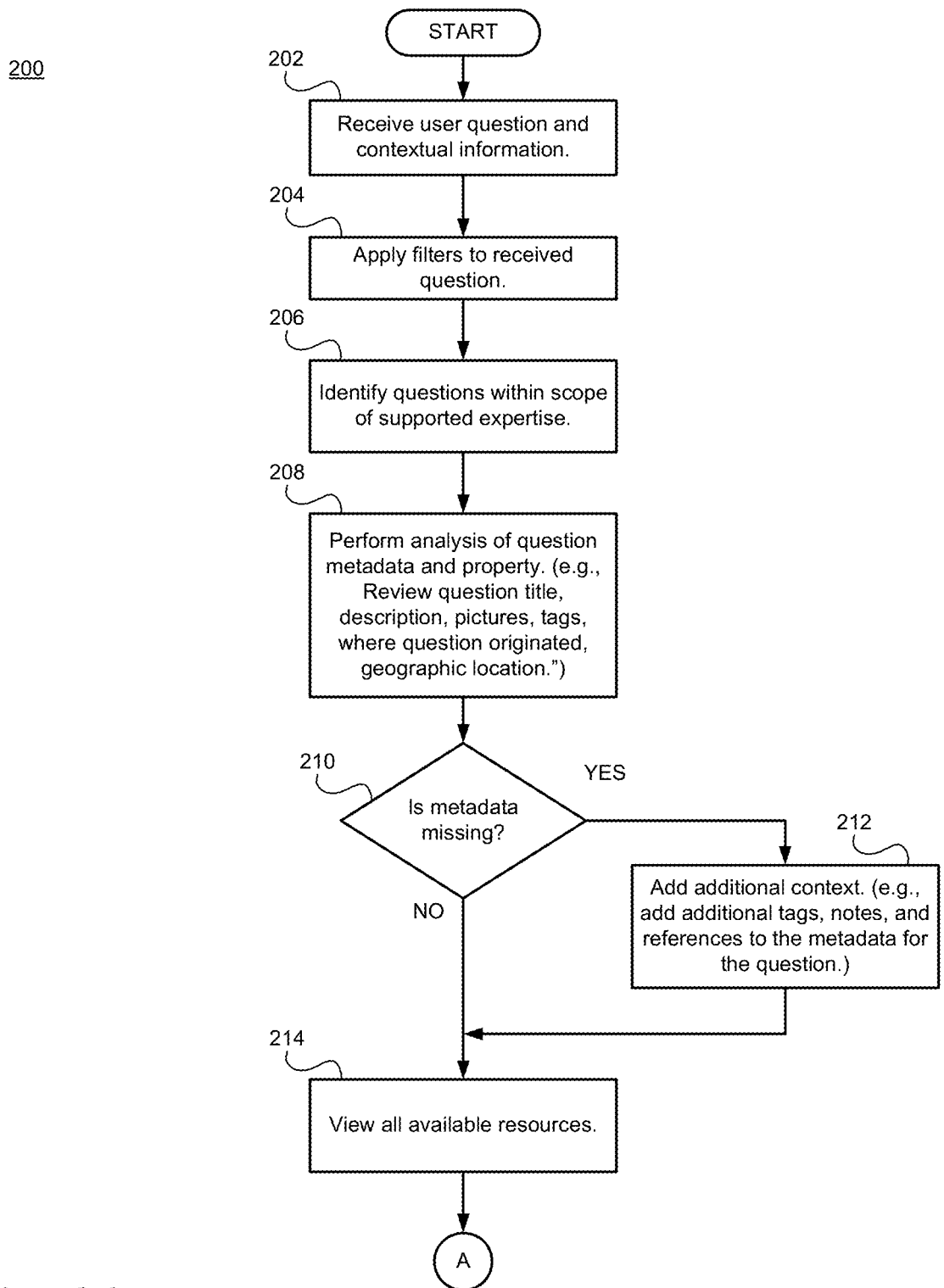
FIGS. 2A-2C are a flowchart illustrating an exemplary method that supports expert audience targeting, in accordance with a representative embodiment of the present disclosure.
Figure 2B:
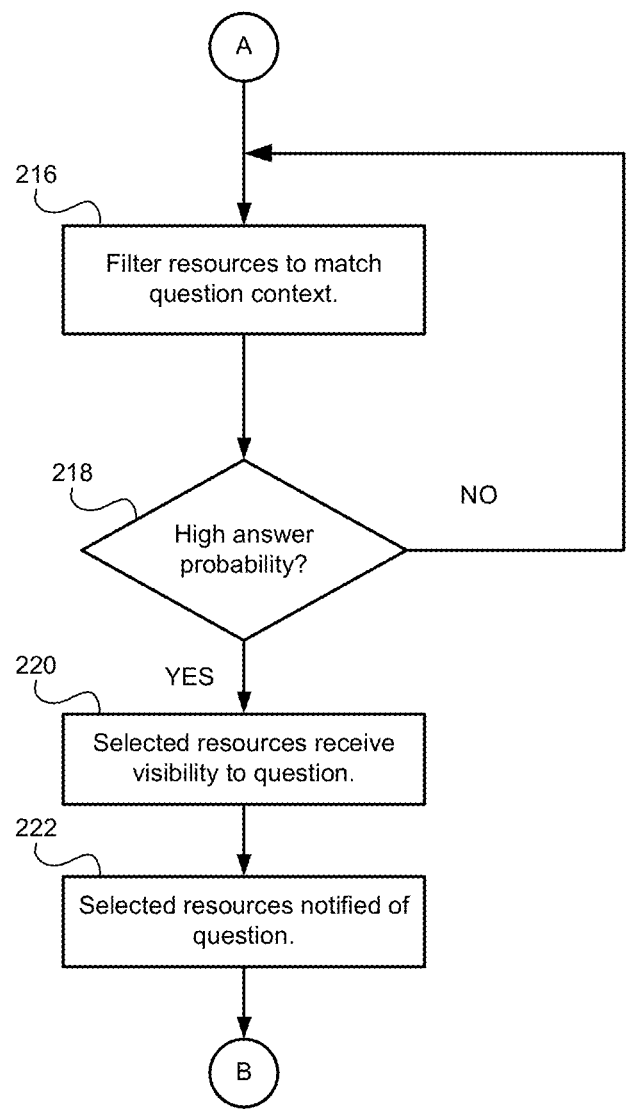
Figure 2C:
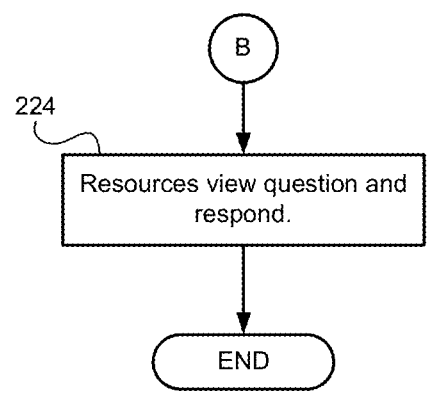

FIGS. 2A-2C are a flowchart illustrating an exemplary method of operating a system that supports expert audience targeting for answering user questions, in accordance with a representative embodiment of the present disclosure.

The method of FIG. 2A-2C begins at block 202, when a system in accordance with the present disclosure receives a question from a user. The method of FIGS. 2A-2C may be performed by any of numerous elements including, for example, the host system 68 of FIG. 1. The question may be received by the system from, for example, a web browser running on a personal computer (PC) of the user, or from a mobile software application or "app" running on a user device such as, by way of example and not limitation, a smart phone; a media player; an e-reader, or a tablet computer, such as the processing devices 20, 20', 20" of FIG. 1. The question may include a title, and at the time the question is received from the user, additional contextual information or "metadata" may be gathered including, by way of example and not limitation, a description that provides additional information about the context of the question (e.g., make and model number of a product, error code displayed by a device that is not working, the current physical location of the individual submitting the question (e.g., at a particular merchant business location, or at a particular geographic location), information identifying the web page from which they are asking the question, personal profile information for the individual (e.g., name, gender, residence address, purchase history, personal product or other preferences, stage of life) that submitted the question, and any tags that may have been associated with the product that is the subject of the question, or tags selected from those on the web page or mobile app screen used by the individual to submit the question.

Next at block 204, the system may apply filtering to the incoming question(s), to eliminate, for example, repeated submission of the same or similar questions by one or several users, and the use of inappropriate or objectionable language in questions. A representative embodiment in accordance with the present disclosure may, while a question is being entered by a user, analyze the submitted text and display to the user similar questions that have been previously submitted by users. Such analysis may use, by way of example and not limitation, keyword and/or natural language processing of the question title and/or description. For example, if the user enters a question related to a particular problem with a product, a representative embodiment in accordance with the present disclosure may, in real-time ("on the fly"), analyze the text of the question and contextual information, and display previously submitted questions about the same or similar product or product problem and the associated answers. The filtering of block 204 may also, for example, detect repeated submission of questions in close succession such as when a system in accordance with the present disclosure may be under attack via the Internet, or is being probed using questions submitted by a robot software application instead of a human user.

Then, at block 206, a system performing the method of FIGS. 2A-2C may identify questions within the scope of the supported expertise of the "support resources" used to address the question. The supported expertise and support resources may be different for different applications of a representative embodiment of the present disclosure. For example, the "supported expertise" for a merchant operating one or more department stores may be those individuals working in each of the various departments (e.g., "Appliances," "Lawn & Garden," "Tools," "Electronics," "Home Services," "Apparel," and "Delivery"). That is, individuals providing knowledge support for answering questions may be grouped into those that have expertise in particular subjects such as, for example, those that have expertise in "Appliances," those that have expertise regarding "Lawn & Garden," those that are knowledgeable about "Tools," and so on. Those individuals acting as "support resources" may be located at a single business location, or at multiple business locations, and the collection of individuals having expertise in a particular subject may be further organized into one or more "support teams." The support teams may be groups of individuals working in different locations or organizations, but having expertise about products or services in a single subject area (e.g., product sales, service, engineering, marketing, or development support teams for e.g., "Appliances," that may be located at the same or different retail sales, service, engineering, marketing, or development locations. Groups of individuals with particular knowledge or skills may be referred to herein as "expert specialty groups" or ESGs.

At block 208, a system in accordance with the present disclosure may support manual or automatic analysis of the user question, and any associated metadata (e.g., contextual information), to identify the appropriate supported resources, support teams, ESGs, or other individual(s) that are best suited to provide answer(s) to the submitted question(s). A representative embodiment of the present disclosure may use natural language processing to analyze the user question, and machine learning techniques may be used to incorporate additional contextual information and feedback into the question analysis. For instance, such analysis may include, by way of example and not limitation, a review of the question title, the description, any contextual information collected or identified, for example, at the time of submission of the user question, and may be adjusted using feedback from the individual that submitted the question and/or support resource members, regarding the correctness, accuracy, quality, and/or usefulness of the answer provided to the individual that originally submitted the question. The result of such analysis may be a list of labels, tags, or other identifiers of the possible subject matter of the user question, each with an associated probability or likelihood that the actual subject matter of the user question is that of the associated label, tag, or other identifier. Any pictures submitted with the user question may be either manually (e.g., by a human reviewer) or automatically analyzed (e.g., using image processing and recognition techniques) to provide additional information about the user question. Information identifying the web page and/or mobile application and screen from which a user question was submitted, and/or the physical, Internet, and/or other network location of the user may also be used to determine the context of the question.

At block 210, a determination is made whether additional metadata (e.g., one or more tags) should be added based on the question title, description, or other contextual information. For example, as described above, a question submitted with an attached picture may be manually or automatically analyzed, and the presence in the picture of a particular product or item may be detected. Based upon the analysis of the question title, the description, and the recognition of a particular product or item in a submitted image, a system in accordance with the present disclosure may, at block 210, determine that certain metadata for the related question is missing, and may then, at block 212, add one or more "tags," or other contextual information, to the metadata for the question, and then continue at block 214. If, at block 210, it is determined that no metadata is missing, the method of FIGS. 2A-2C may then continue at block 214.

At block 214, a system according to the present disclosure may support a view of all support resources available to address the submitted question. For example, in some representative embodiments according to the present disclosure, this may include a means (e.g., a web page or screen display) that permits an operator of the system to manually select the support resources to which the submitted question will be distributed, and request distribution of the question and metadata to the selected support resources. This may occur, for example, when the information provided by the individual submitting the question contains ambiguities so that determination of the appropriate support resource(s) cannot be resolved without human intervention. In other representative embodiments, this may involve automated analysis to determine the collection of all support resources that are currently available, and the later automatic distribution of the question to the available support resources. For example, the analysis of the user question may produce a list identifying a number of different labels, tags, or other identifiers of the possible subject matter of the user question, and therefore an appropriate support group, each indicating an associated probabilities or likelihood. When the probability or likelihood associated with a particular label, tag or other identifier is above a particular threshold, a system in accordance with the present disclosure may proceed to distribute the user question to one or more member(s) of the support group associated with the particular label, tag or other identifier that is above the particular threshold (i.e., "dominant"), without human intervention. However, in other situations, where the analysis of the user question produces a list of labels, tags, or other identifiers of possible subject matter, each with associated probabilities or likelihoods that are below the particular threshold, it may be determined that it is unclear as to what subject matter (e.g., the particular product or service, or the category of products or services) the question actually pertains, and to which support group the question should be distributed. In that instance, the user question, along with context and any metadata, may be sent to, for example, a human moderator, to determine which of the support resources is most appropriate.

At block 216, a system in accordance with the present invention may filter or refine the support resource(s) to which the user question is to be distributed to better match the user question and the contextual information. For example, support resource(s) identified by the analysis described above may be filtered or refined based upon their online status, their department, their physical/geographic location, the proximity to the individual that submitted the question, the number of members of the support resource needed to attain a particular level of answer quality or answer probability, and additional contextual data or metadata that may be related to answer performance or quality. In accordance with the present disclosure, a system performing the method of FIGS. 2A-2C may make an initial selection or filtering of support resources that are expected to produce a particular answer probability or quality level. This expected level may be based on, for example, voting results from users or members of the support resource(s) for answers that have been previously provided by the selected support resources identified by the analysis described above.

At block 218, the system may determine whether the selected support resources (i.e., selected support teams and/or selected members of selected support teams) provide a sufficiently high level of answer probability or answer quality. For example, the filters used in the initial selection of support resources may be updated to provide a particular number of support resources to realize a desired level of answer quality or answer probability. For example, in one representative embodiment in accordance with the present disclosure, if sufficient members of the support resources are not available within a certain distance of the individual submitting the question to realize an acceptable or desirable level of answer quality or answer probability, then the filters or refinement used to select the members of the target audience from the support resource may be adjusted, to increase the number of members to which the question is distributed, in order to attain the acceptable or desired level of answer quality or answer probability. In addition, the filters or refinement algorithms may be adjusted to include in the target audience, members of the support resources that come from "top performers." The term "top performers" may be used herein to refer to those members of the support resources that have shown themselves, for example through the voting by, for example, users submitting questions, other support resource members, ESG members, and others, including members of, for example, a loyalty program of a merchant, to provide high quality answers to questions in a particular subject area. One or more thresholds may be applied to determine whether the answer quality or answer probability meets the needs of the system operator or sponsor. In some representative embodiments according to the present disclosure, members of a merchant loyalty program and others may be provided with a means on the system to view questions and answers submitted by other members, support resource members, and ESG members, and may vote on their feeling about the correctness, accuracy, and/or usefulness of the available answers. The result of such voting may, for example, be used to identify those individuals that are invited to join an ESG, that are awarded a "badge" to be displayed on a page of the individual, or may be used in preparing a ranking of individuals (e.g., a "leader board") according to their level of expertise in providing answers of value to others. Such voting may also be used to adjust the operation of the analysis, refinement, and/or filtering algorithms described above.

Next, at block 220, the selected members of the support resources may receive visibility to the question. That is, the question may be made available to those members of an ESG or other support resource selected as the target audience for the question. Making the question available may include, for example, placing the questions and related metadata on a web site accessible to the support resources and others.

Then, at block 222, the selected members of the support resources may be sent a notification that a new question is available for review and response. For example, those of the selected support resources that are on-line (i.e., electronically connected or communicatively coupled to the system performing the method of FIGS. 2A-2C) may be sent a notification when a new question has been distributed that is in their area of expertise and for which they were selected as a recipient from which an answer is requested. Such a notification may be sent via, by way of example and not limitation, any suitable wired or wireless communication network, whether public or private, including cellular data, one or more wireless local area or personal area networks, short message service (SMS), multimedia messaging service (MMS), the Internet, a paging network, and a corporate intranet or proprietary corporate wireless network. Access to the question and the related metadata may be via a similar communication technology, but need not be via the technology used to deliver the notification. Any response to the question from the support resource member may, for example, be sent back to the system using any suitable path such as those just mentioned, and need not be via the communication path through which the notification was distributed, or the question and/or metadata accessed. In some representative embodiments in accordance with the present disclosure, the notifications may not be queued and may be delivered only to those of the selected support resources that are currently online and connected at the time of distribution of the notification, to help insure a timely response.

At block 224, the selected resources may review the user questions (and the related metadata and context information), and provide an answer response accessible to the individual that submitted the question. The answer from the selected support resource(s) may also be sent to other members of the support resources, along with a request that those other members provide their feedback on the correctness, accuracy, quality, and/or usefulness of the answer to the user question(s). Such feedback may take the form of a simple yes or no vote that the answer was appropriate, or may provide a range of possible values (e.g., 1 to 10), indicating their feeling about the level of accuracy, correctness, quality, and/or usefulness of the answer provided to the user(s). Such feedback may then be used in adjusting the algorithms used in the analysis of the user question, context, and metadata, and/or the algorithms used to filter and/or refine the support resource(s) to which future user questions are directed. Notice of the availability of the answer may be sent via any of the communication means described above, and may involve sending a notification of answer availability to the individual that submitted the question via any suitable communication means, as described above.

Figure 3:
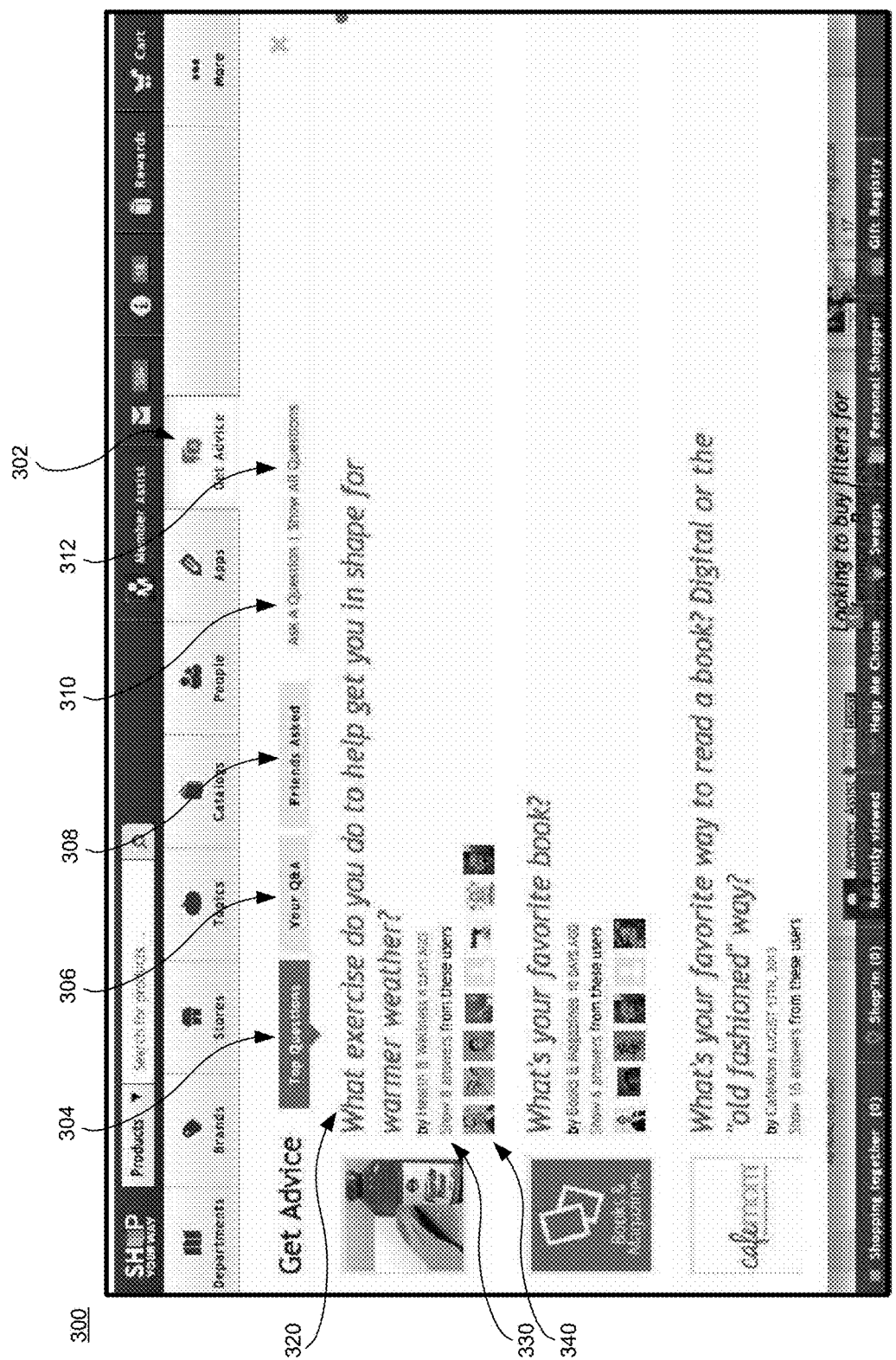
FIG. 3 illustrates a screen image of an exemplary user interface web page supporting, among other things, user submission of and access to questions and answers, in accordance with a representative embodiment of the present disclosure.

FIG. 3 illustrates a screen image of an exemplary user interface web page 300 supporting, among other things, user submission of and access to questions and answers, in accordance with a representative embodiment of the present disclosure. As shown in the example of FIG. 3, the web page 300 includes a "Get Advice" tab 302 that provides access to a listing showing a number of the "Top Questions" 304, and a "Your Q&A" tab 306 that provides access to a listing of "Your Questions" including the questions of the viewer of the web page 300. The web page 300 also includes a "Friends Asked" tab 308 that provides access to a listing showing questions "Friends Asked." In addition, the "Get Advice" tab 302 includes an "Ask a Question" link 310 that permits the viewer of Web Page 300 to submit their own question to the system, and a "Show All Questions" link 312 that permits the viewer to see a listing of all questions that have been submitted to the system by the users.

As shown in FIG. 3, the information for each question includes a title of the question 320, a link 330 that indicates the number of available answers that permits the viewer to see the available answers, and thumbnail images 340 of the respondents providing the available answers.

Figure 4:
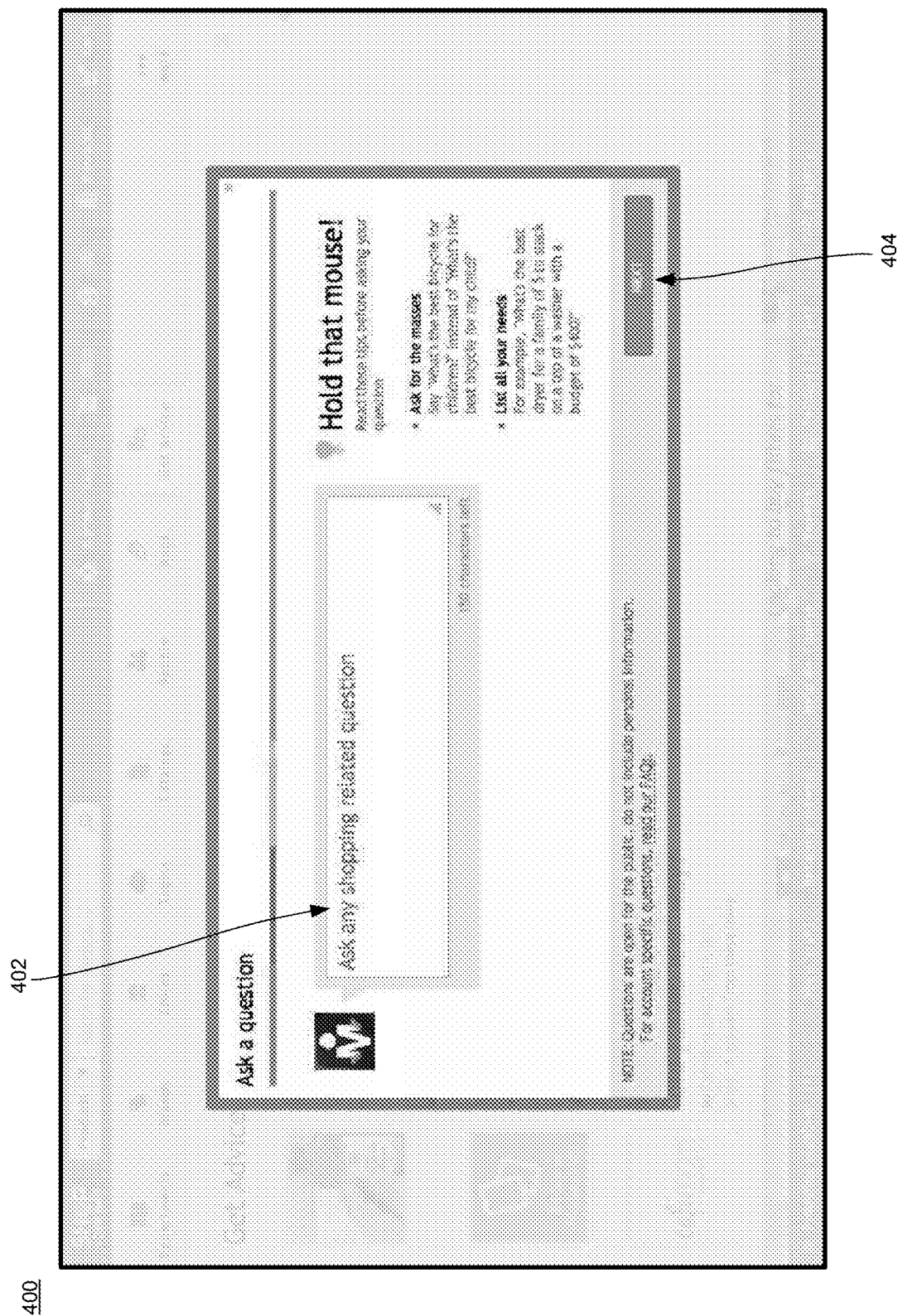
FIG. 4 illustrates a screen image of an exemplary pop-up window that may be displayed when the user selects/clicks the "Ask a question" link of FIG. 3, in accordance with a representative embodiment of the present disclosure.

FIG. 4 illustrates a screen image of an exemplary pop-up window 400 that may be displayed when the user selects/clicks the "Ask a Question" link 310 of FIG. 3, in accordance with a representative embodiment of the present disclosure. The pop-up window includes a text box 402 for entry of a question by the viewer, and a "Next" button 404 that permits submission of the question.

Figure 5:
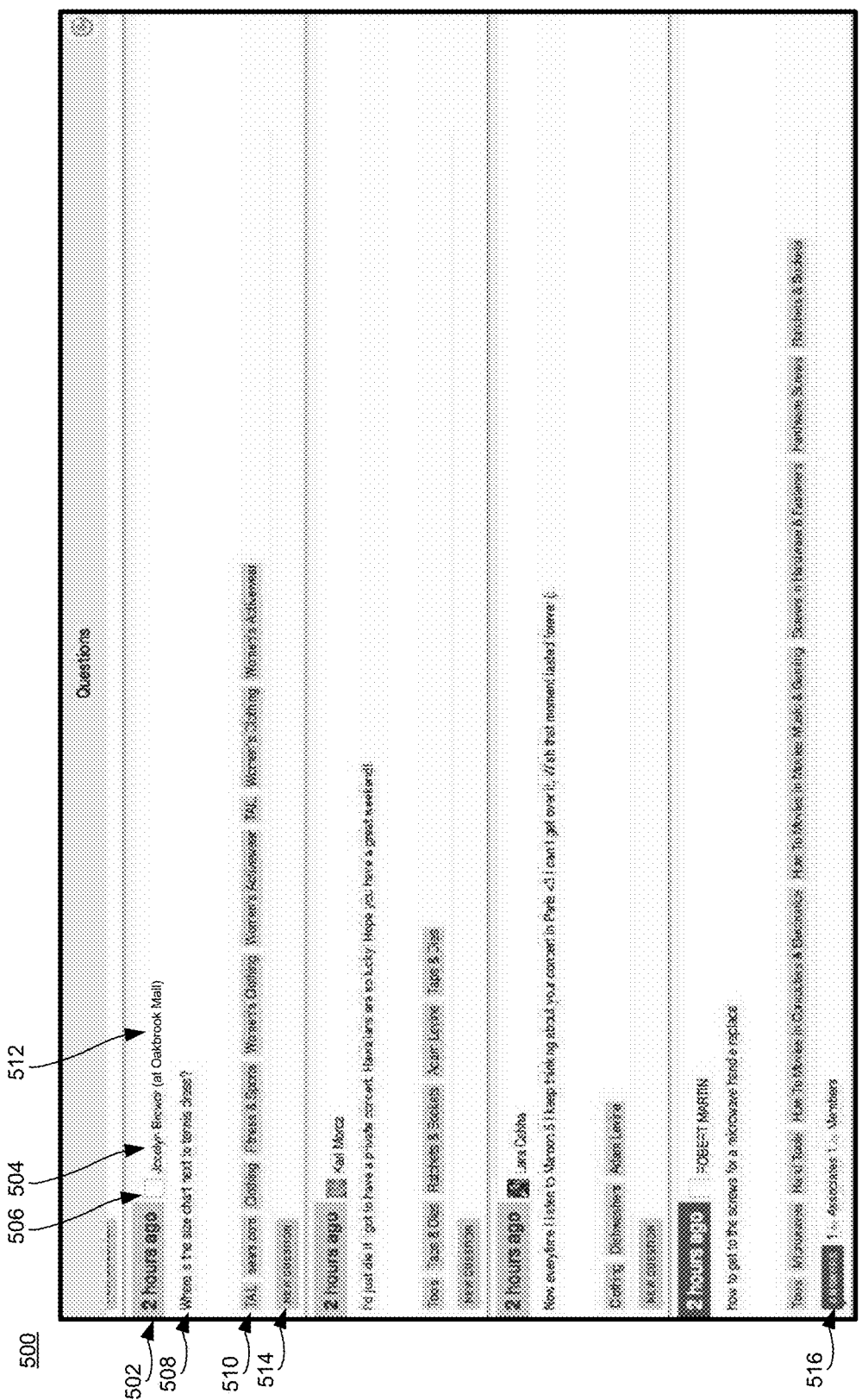
FIG. 5 illustrates an exemplary screen image showing a listing of questions that have been submitted by users, in accordance with a representative embodiment of the present disclosure.

FIG. 5 illustrates an exemplary screen image showing a listing of questions 500 that have been submitted by users, in accordance with a representative embodiment of the present disclosure. Each question of FIG. 5 includes an indication 502 showing how long prior to viewing the listing that the question was submitted, a user name 504 and thumbnail image 506 (i.e., if available) identifying the individual that submitted the question, the text of the question 508, a list of tags 510 associated with the question, the location of the user when the user asked a question 512, and a link 514 that permits the viewer to submit a new question. A link 516 is also included, if answers to a particular question are available, to permit the viewer to access answers to the displayed questions, and indicators of the number of answers available for viewing and the number of answers submitted by "Associates" and "Members."

Figure 6:
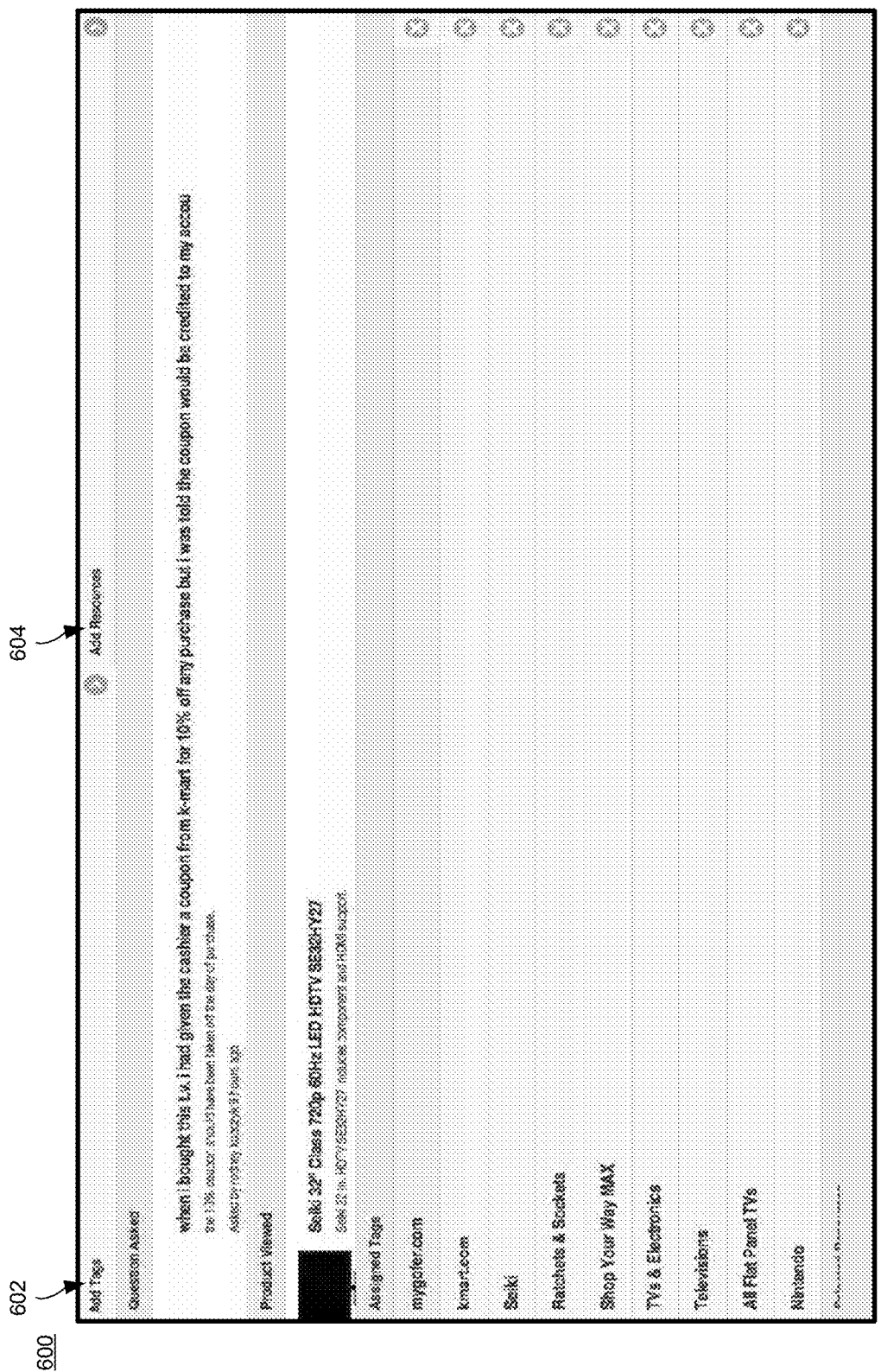
FIG. 6 illustrates an exemplary screen image displaying a question details page, in accordance with a representative embodiment of the present disclosure.

FIG. 6 illustrates an exemplary screen image displaying a question details page 600, in accordance with a representative embodiment of the present disclosure. The question details page 600 of FIG. 6 includes a question text field that displays the text of the question as entered by the individual that submitted the question, and information identifying the submitter of the question; an "Add Tags" link 602 to enable the viewer to manually add one or more tags to the question submission; and an "Add Resources" link 604 that may be selected to add support resources to which the indicated question should be directed. In addition, the question details page 600 includes a "Product viewed" field that displays information about the product that is the subject of the listed question. The question details page 600 may, for example, be presented to a member of a support resource or support team to which the question was distributed, or by a human moderator, when the appropriate support resource cannot be determined using the automated analysis described above.

Figure 7:
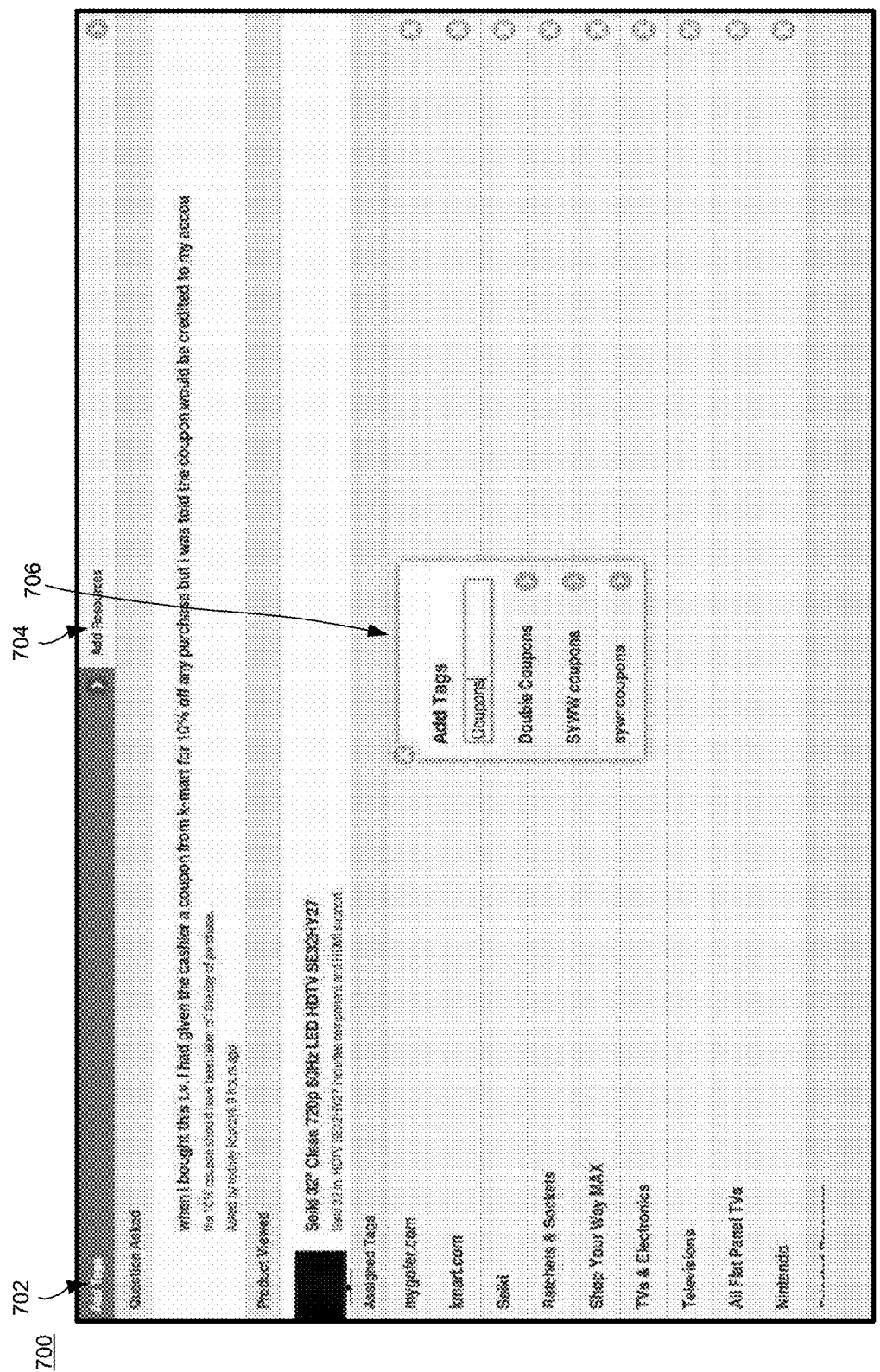
FIG. 7 illustrates an exemplary screen image showing an "Add Tags" pop-up window, in accordance with a representative embodiment of the present disclosure.

FIG. 7 illustrates an exemplary screen image 700 showing an "Add Tags" pop-up window 706, in accordance with a representative embodiment of the present disclosure. The "Add Tags" pop-up window 706 enables the viewer to manually add selected tags to the information about the displayed question, following selection of the "Add Tags" link 602 of FIG. 6. The illustration of FIG. 7 also includes an "Add Resources" link 704 that permits the viewer to add a support resource to those to which the related user question to be answered will be distributed.

Figure 8:
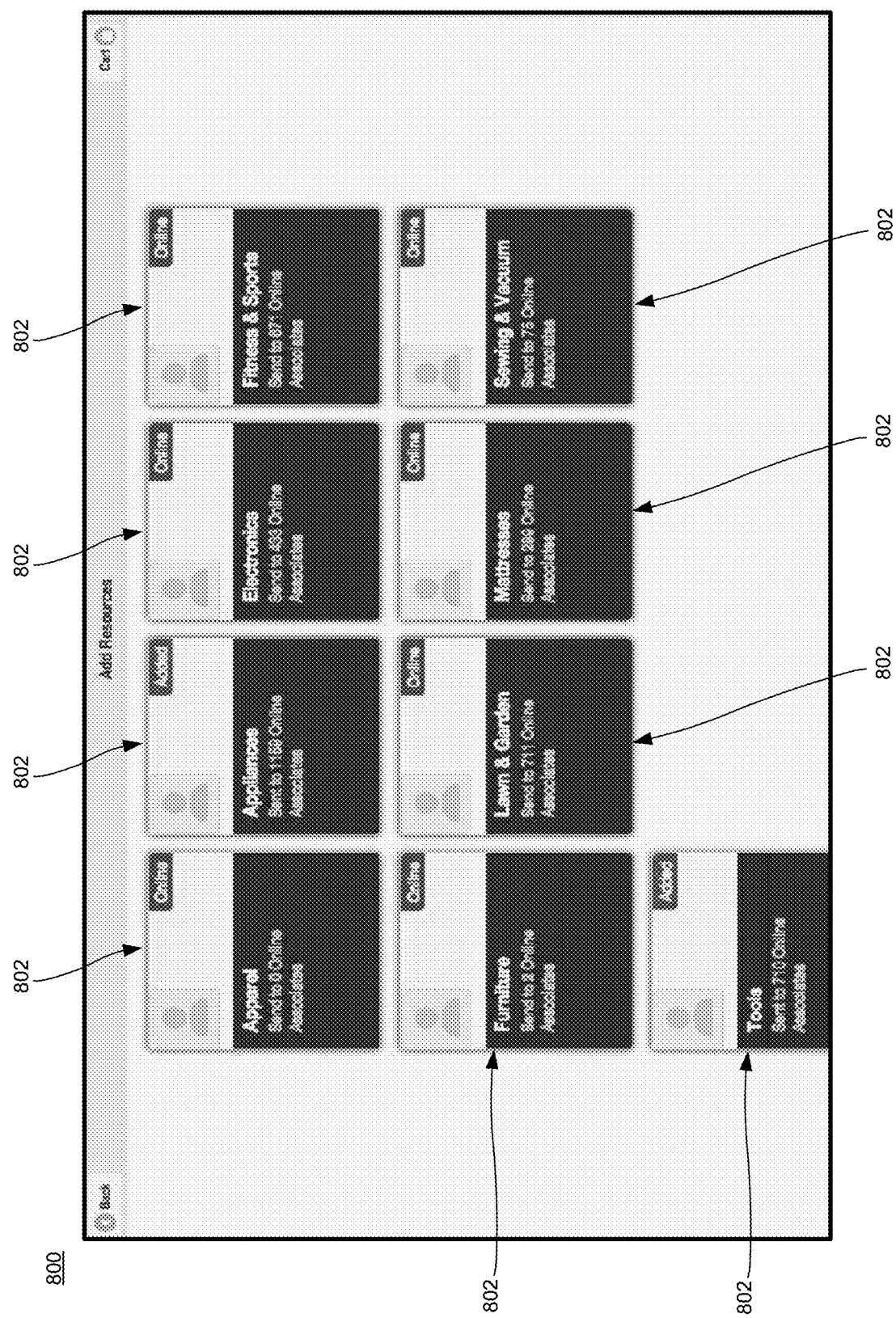
FIG. 8 illustrates an exemplary screen image showing an "Add Resources" page, in accordance with a representative embodiment of the present disclosure.

FIG. 8 illustrates an exemplary screen image showing an "Add Resources" page, in accordance with a representative embodiment of the present disclosure. The "Add Resources" page 800 may be displayed following selection of the "Add Resources" links 604, 704 of FIG. 6 and FIG. 7, respectively. As shown in the screen image of FIG. 8, the "Add Resources" page 800 permits the viewer to manually direct the question to support resources in a number of "expert specialty groups" 802 including, by way of the example of FIG. 8, "Apparel," Appliances," "Electronics," "Fitness & Sports," "Furniture," "Lawn & Garden," "Mattresses," "Sewing & Vacuum," and "Tools," but a representative embodiment of the present disclosure is not limited thereto. It should be noted that representative embodiments in accordance with the present disclosure may support other ESGs, and those shown in the present disclosure are for purposes of illustration only. Each ESG 802 shown on the "Add Resources" page 800 includes an indication of the number of members (i.e., "Associates") that are online and available to receive a question in the respective ESG.

Figure 9:
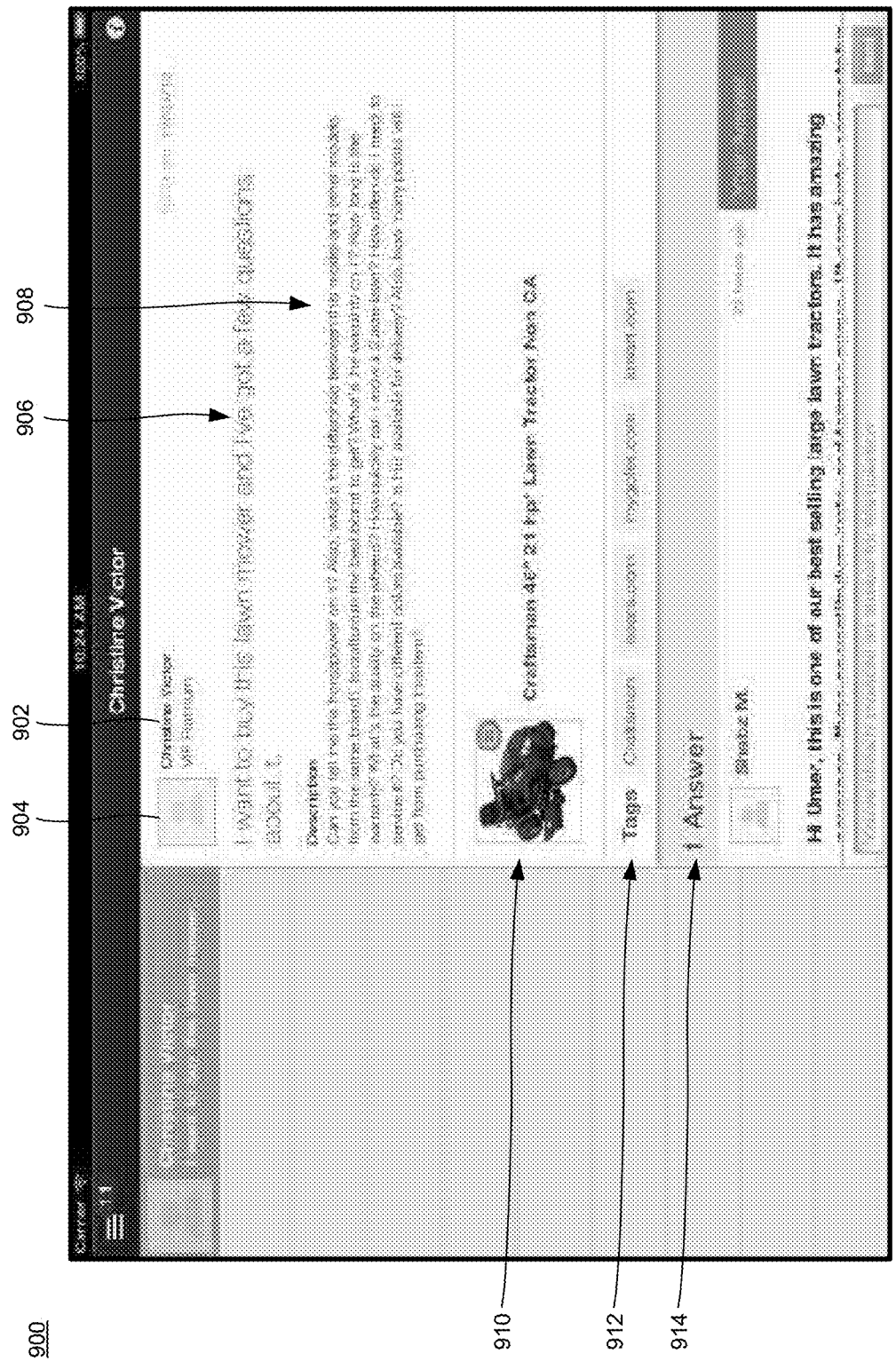
FIG. 9 illustrates an exemplary screen image showing a question and answer display page, in accordance with a representative embodiment of the present disclosure.

FIG. 9 illustrates an exemplary screen image showing a question and answer display page 900, in accordance with a representative embodiment of the present disclosure. The submitted question and answer display page 900 includes the name 902 and thumbnail image 904 of the individual that submitted the question, the title of the question 906, a description 908 providing further details about the question, product information and an image 910 of the product related to the question, a list a tags 912 associated with the question, and a listing of answers 914, containing only one answer, that has been submitted in response to the question 906.

Figure 10:
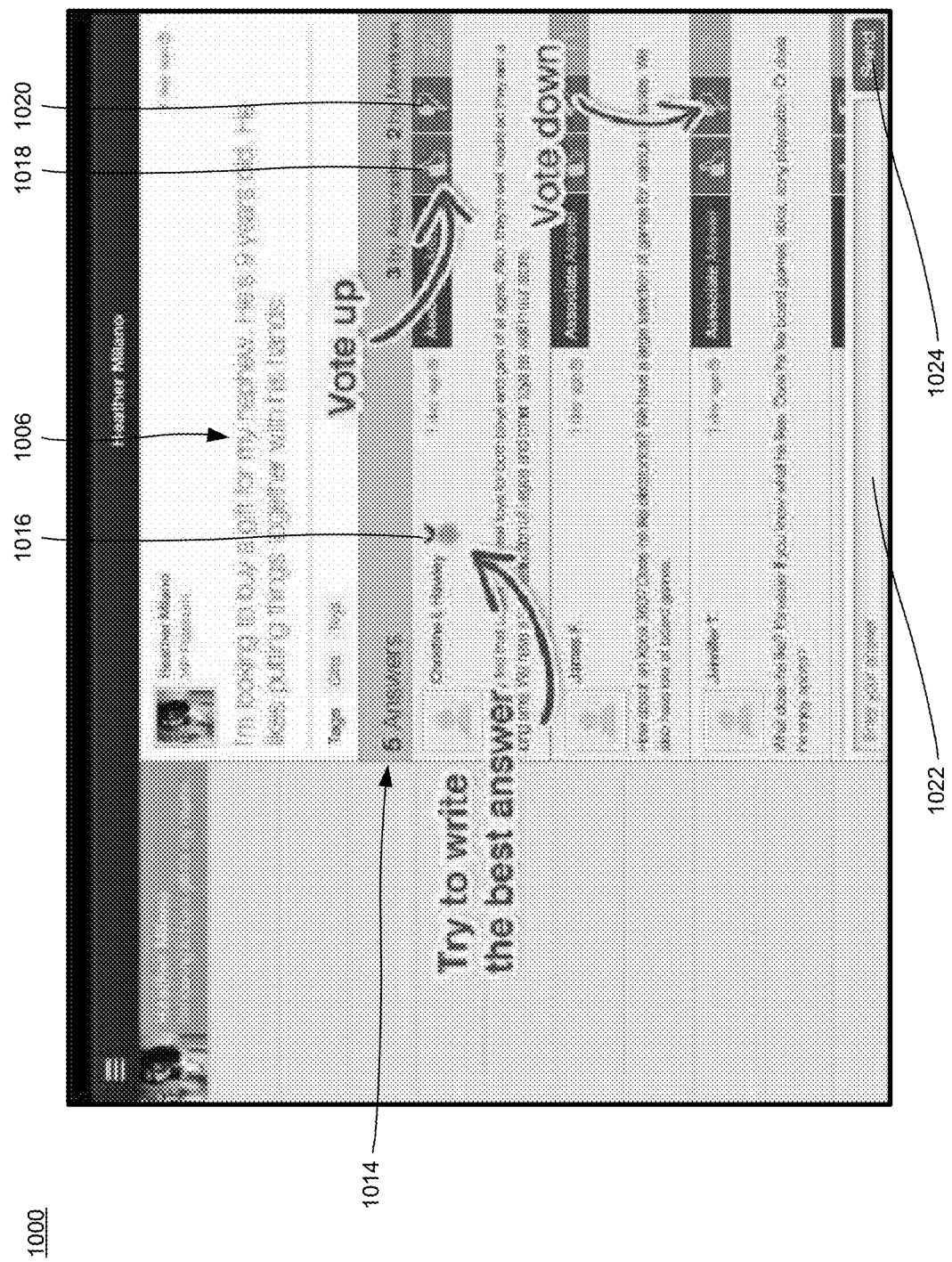
FIG. 10 illustrates another exemplary screen image showing a question and answer display page listing a question and a number of answers to the listed question, in accordance with a representative embodiment of the present disclosure.

FIG. 10 illustrates another exemplary screen image showing a question and answer display page 1000 listing a question 1006 and a number of answers 1014 to the listed question, in accordance with a representative embodiment of the present disclosure. The question and answer display page 1000 includes features similar to those of FIG. 9. In addition, the example of FIG. 10 shows a badge icon 1016 awarded to the individual of one of the submitted answers based on quality of the answer, a "Vote Up" icon 1018 to permit a viewer of the answer to give the answer a positive review, and a "Vote Down" icon 1020 to permit a viewer of the answer to give the answer a negative review. The example of FIG. 10 also include indicators showing information identifying the numbers of answers submitted, and whether the answers were submitted by "Associates" working for the merchant or business operating or sponsoring the system supporting an embodiment of the present disclosure, or by "Members" including customers of the merchant or business belonging to, for example, a loyalty program operated by the merchant or partner of the merchant. The question and answer display page 1000 also includes a text field 1022 for entry of an answer to the displayed question, and a "Send" command button 1024 to permit the submission of the answer text.

Figure 11:
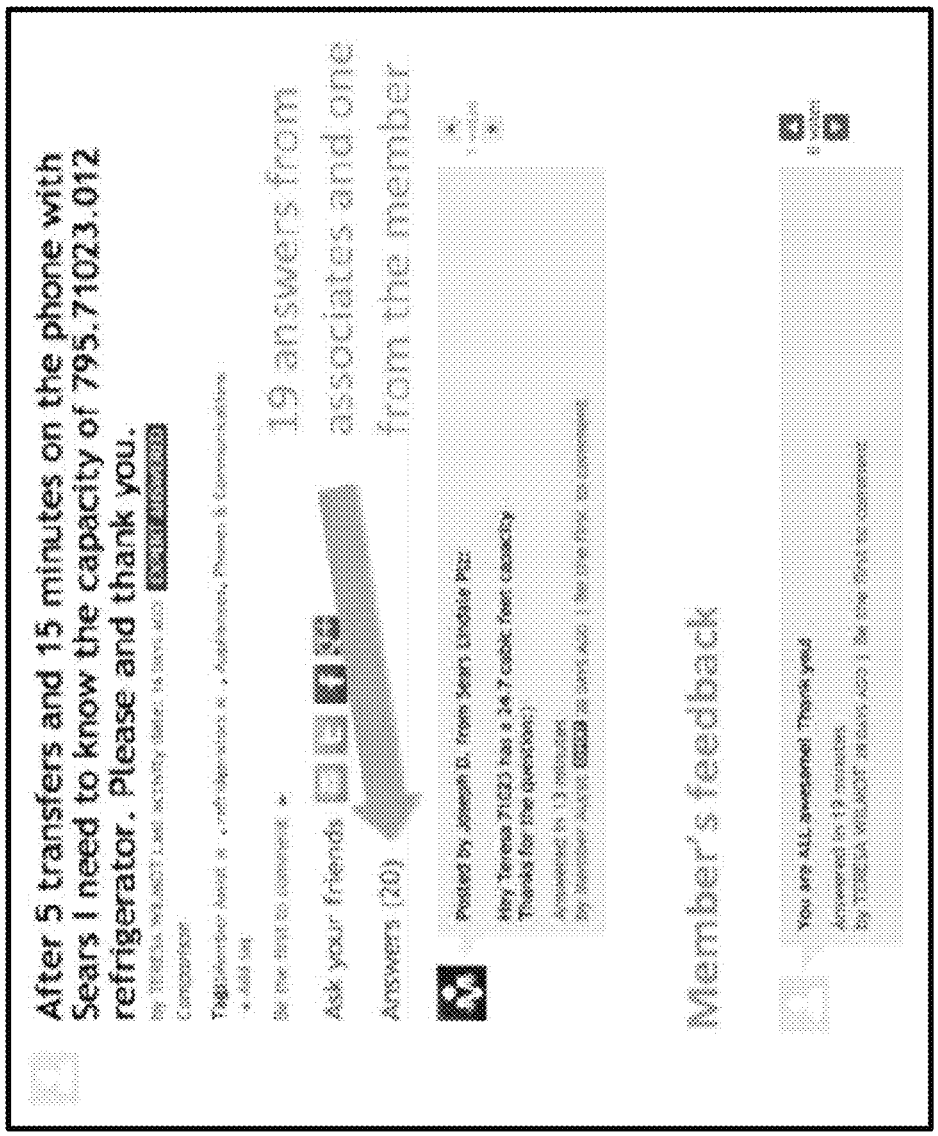
FIG. 11 illustrates an exemplary screen image showing an example web page showing a question and a listing of answers submitted by support resources, along with feedback from the individual that submitted the question, in accordance with a representative embodiment of the present disclosure.

FIG. 11 illustrates an exemplary screen image showing an example web page 1100 showing a question and a listing of answers submitted by support resources, along with feedback from the individual that submitted the question, in accordance with a representative embodiment of the present disclosure.

Figure 12:
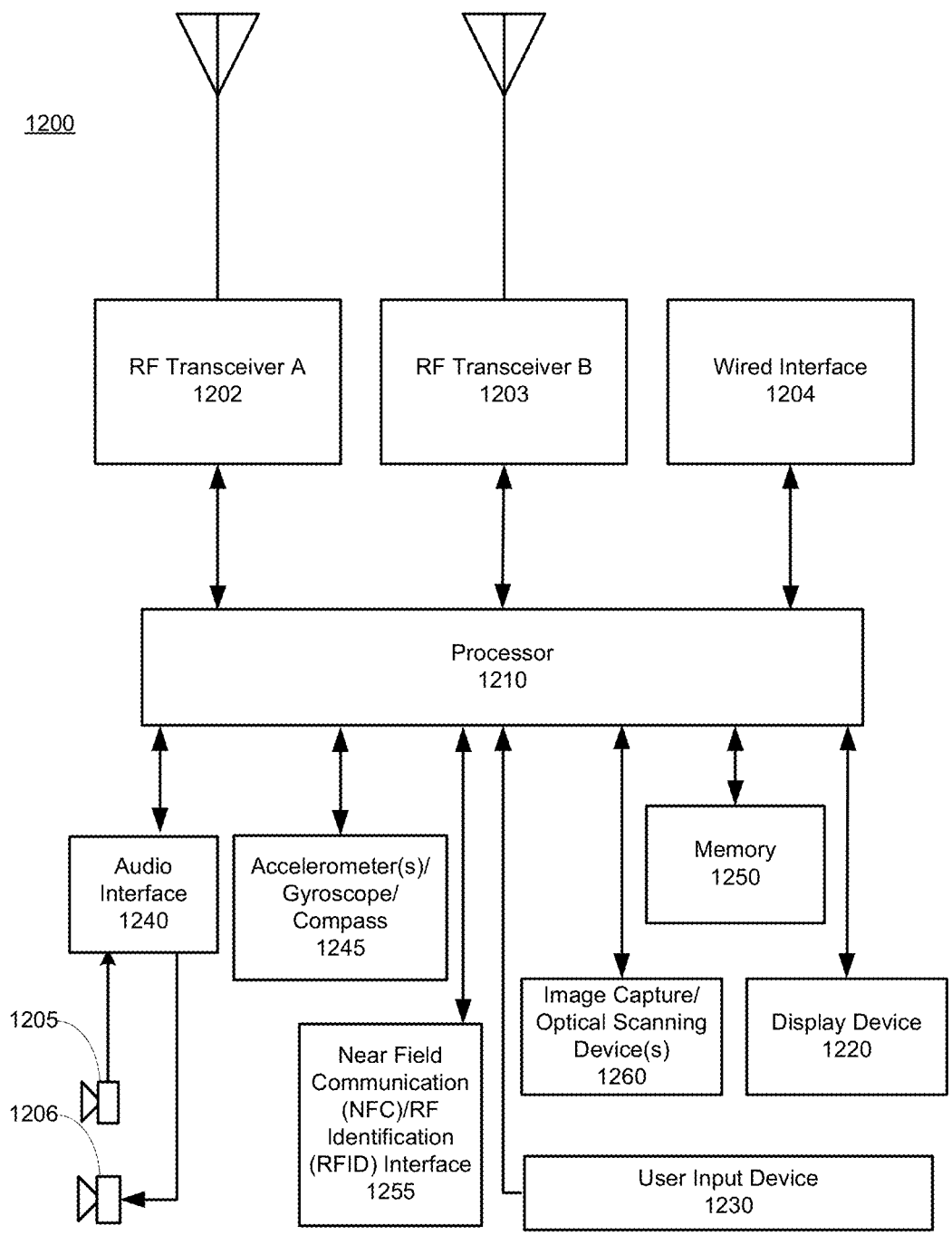
FIG. 12 is a block diagram illustrating a personal electronic device that may correspond, for example, to electronic devices shown in FIG. 1, in accordance with a representative embodiment of the present disclosure.

FIG. 12 is a block diagram illustrating a personal electronic device 1200 that may correspond, for example, to electronic devices 20, 20', 20" shown in FIG. 1, in accordance with a representative embodiment of the present disclosure. The personal electronic device 1200 may correspond to electronic user devices such as, by way of example and not limitation, a smart phone, a tablet computer, a cellular phone, a media player, a handheld personal computer, a laptop, a notebook computer, a netbook computer, a desktop computer, a television, or any other suitable electronic device having the functionality discussed herein.

As shown in FIG. 12, the personal electronic device 1200 includes a processor 1210, an RF transceiver A 1202, an RF transceiver B 1203, a wired interface 1204, a display device 1220, a user input device 1230, an audio interface 1240, and a memory 1250. The processor 1210 may be, for example, a suitable microprocessor or microcomputer having sufficient computing power to control the personal electronic device 1200, and is operably coupled to the RF transceiver A 1202, the RF transceiver B 1203, and the wired interface 1204. The RF transceiver A 1202 and RF transceiver B 1203 may comprise any necessary circuitry, logic, and software/firmware for wireless communication over any of, for example, the cellular, Bluetooth, Wi-Fi (e.g., IEEE 802.11 a/b/g/n/ac), Zigbee, WiMAX, NFC (Near Field Communication), or any other wireless network known now or in the future. The wired interface 1204 may comprise any necessary circuitry, logic, and software/firmware for wired communication over any of, for example, an Ethernet, Universal Serial Bus, FireWire (IEEE 1394) or other wired networks known now or in the future.

The processor 1210 is also operably coupled to the memory 1250, and may be used for non-transitory storage of executable program instructions, parameters, and data for any of the circuitry of the personal electronic device 1200. The display device 1220 is also operably coupled to the processor 1210, and may comprise, for example, one or more LED, OLED, LCD, or other form of visual display capable of presenting text or graphics, and may comprise any circuitry, logic, or software/firmware to support, for example, a graphical user interface (GUI). The user input device 1230 may comprise, for example, suitable switches, buttons, or touch sensitive surfaces to enable user control and operation of the personal electronic device 1200, and may comprise any necessary circuitry, logic, and software/firmware to allow it to perform those functions. In a representative embodiment of the present disclosure, the user input device 1230 may be a touch sensitive surface at the viewing side of the display device 1220, enabling a user to use the touch sensitive surface of the display device to enter user inputs and respond to displayed information. The audio interface 1240 comprises any necessary circuitry, logic, and software to interface a microphone 1205 and a speaker 1206 to the processor 1210.

Figure 13:
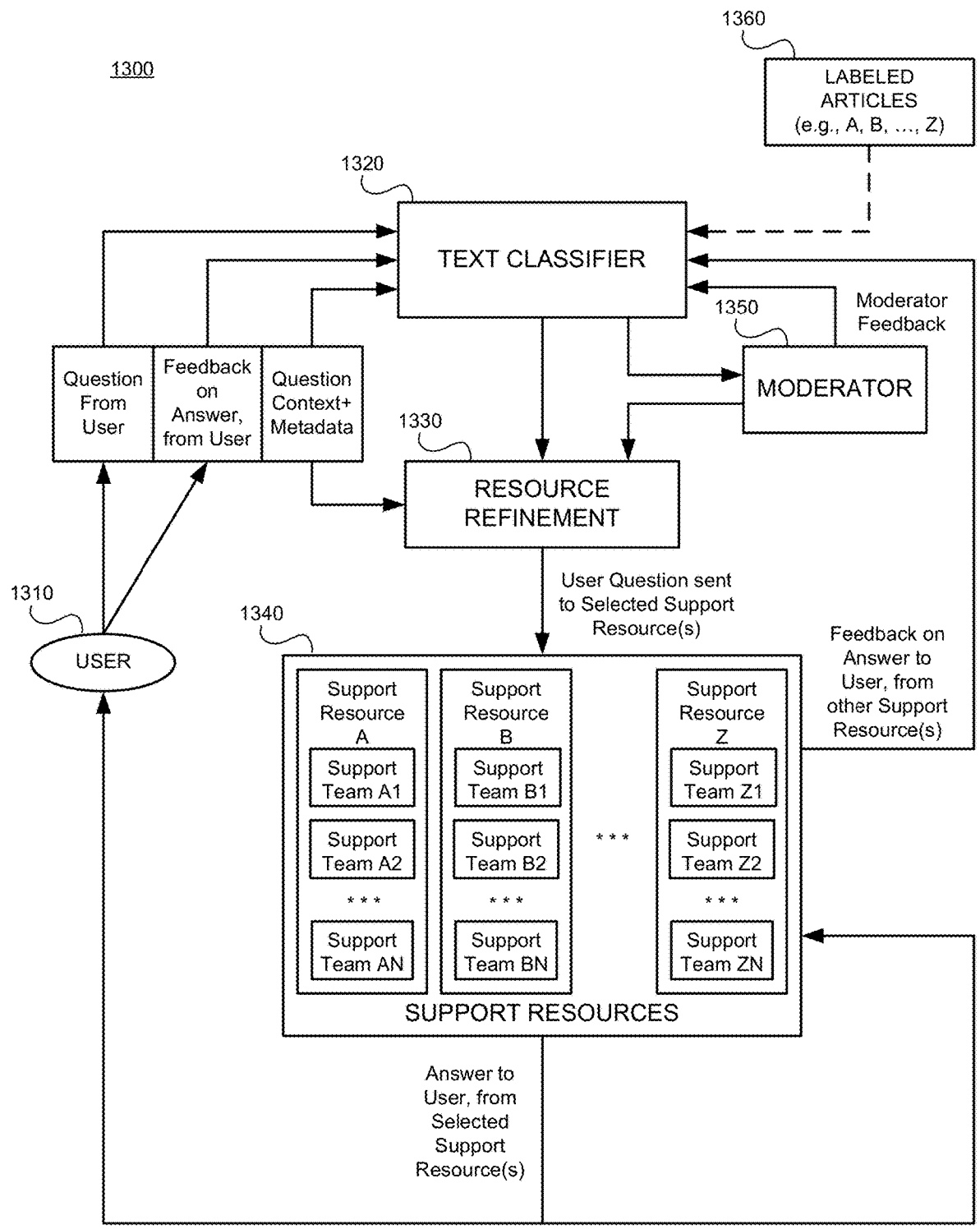
FIG. 13 is a block diagram illustrating an example architecture and information flow of a system for providing expert audience targeting, in accordance with a representative embodiment of the present disclosure.

FIG. 13 is a block diagram illustrating an example architecture and information flow 1300 of a system for providing expert audience targeting, in accordance with a representative embodiment of the present disclosure. The illustration of FIG. 13 shows a user 1310 and system functional elements including, for example, a text classifier block 1320, a resource refinement block 1330, a support resources block 1340, a moderator block 1350, and a labeled articles block 1360. It should be noted that functionality of the various functional elements shown in FIG. 13 may be reorganized or repartitioned in different ways without departing from the spirit and scope of the present disclosure.

The user 1310 represents those individuals that as users of the system are looking for an answer to one or more questions about, for example, a product or service, and submits their question(s) to a representative embodiment of the present disclosure.

The text classifier 1320 receives questions from users, and identifies one or more subject areas or categories to which the question may be directed. The text classifier may analyze the text of the user question, and assign a set of labels or identifiers of subject matter areas or categories to which the text classifier determines that the user question is most likely directed, along with an associated likelihood or probability that the label or identifier is correctly selected for that user question. The analysis of the question may be performed using, for example, a natural language processing algorithm such as the Stanford Classifier developed at Stanford University in Palo Alto, Calif., which may run on a computer system such as, for example, the computer system 80 of FIG. 1. The labels or identifiers assigned to each question may, for example, be from the set of labels or identifiers attached to or associated with each article of a collection of articles of known subject matter, which may be used to train the text classifier 1320. In a representative embodiment of the present disclosure, each of the labels of identifiers may be mapped to a support resource whose members have the expertise to answer questions on the corresponding subject matter areas or categories. A repository of labeled articles used for training the text classifier 1320 is shown in FIG. 13 as labeled articles repository 1360, which may reside, for example, in the data storage 80A of the computer system 80 of FIG. 1. In addition, the text classifier 1320 may use machine learning techniques that adjust the operation of the text classifier 1320 to feedback provided by, for example, the user that submitted the question, and other members of the support resources that prepare answers to user questions.

The resource refinement functionality 1330 may be used to more specifically select the support resources to receive a user questions. For example, the resource refinement functionality may select a specific support team from all of the support teams that answer questions on "Appliances," and further, may select one or more specific members within the selected support teams, based on the context of the user question, the metadata that accompanied the user question, and specific information about individual members of the support resources and support teams. For example, a representative embodiment of the present disclosure may maintain historical information about the various answers provided to users by each individual member of each support resource, and may include the support resource and support team to which they belong. The historical information may include parameters such as the level of satisfaction of users and support resource members in the answers provided by each member of the support resource, the level of accuracy of the answers, and a user-perceived level of quality of information provided by the support resource members and support teams. In addition, the resource refinement functionality may maintain information identifying work schedules, or presence information indicating whether the various members of the support resources are currently available to immediately respond to a user question. The selection of the support resource(s) to which to distribute a user question use such information to minimize the delay in responding to the user question, by selecting one or more members of the support resource(s) that, based on historical performance and real-time personnel information to maximize the level of quality of a response to a user question, while minimizing the delay in responding with an answer.

The illustration of FIG. 13 also includes a representation of the support resources 1340 drawn upon to answer user questions. As shown in the example of FIG. 13, the support resources block 1340 is made up of a collection of support resources A, support resources B, . . . , support resources Z, corresponding to the labels or identifiers of the subject matter areas or categories of questions handled by each support resource, and that may correspond to the labels or identifiers assigned to each of the labeled articles in the labeled articles repository 1360, used in training the text classifier 1320. As shown in FIG. 13, each of the support resources A, support resources B, . . . , support resources Z may be made up of a number of support teams, such as support team A1, support team B2, and so on. Each of the various support teams for each support resource for a subject matter area or category may be located at a different location, or be made up of individuals having a different role. For example, members of some support teams may be from "brick-and-mortar" retails sales, while others may be what is referred to herein as "personal shoppers," while still others may be from the purchasing, manufacturing, engineering, marketing, online retail sales, or other organizations of a business entity. In addition, members of support teams may include other users like that which submitted a given question, such as those having shown themselves to have particular knowledge of certain subject matter areas or categories. Such individuals may not be part of the organization operating or sponsoring the system of the present disclosure, and may be invited by the operator or sponsor of the system, based on historical monitoring, by the operator or sponsor, of user contributions, reviews, comments, and user expression of feelings about products, services, and the like, using social indicators such as "like," "want," "have," and requests to "follow," and voting on various comments, reviews, and product or service information. The desired output of the collection of support resources 1340 are high quality, accurate, and useful answers to user questions, in which each answer is then distributed back to the user that asked the corresponding question. In a representative embodiment according the present disclosure, the answers to user questions may be sent not only to the user 1310 that asked the questions, but may also be made available to members of the collection of support resources 1340, who may then evaluate the answers given, and vote to indicate their assessment about the quality, accuracy, correctness, and/or usefulness to each of the answers given to the corresponding question that was asked. The memory of a computer system supporting an embodiment of the present disclosure may be configured to store a number of data items that may be associated in storage with one another including, for example, the question asked, the support team(s) and/or support team member (s) tasked with providing an answer to the submitter of the question, the feedback by the user to the answer provided, the feedback (e.g., voting) provided by other members of the support resource(s) to a given questions and answer, and the context and any metadata for the question.

The illustration of FIG. 13 also includes a moderator 1350, which may be a person tasked with resolving issues that arise in processing questions that are, for example, at a level of ambiguity that precludes automated distribution to the most appropriate support resource(s) using only the analysis and refinement algorithms represented by the text classifier 1320 and resource refinement 1330 elements of FIG. 13. For example, in some instances, the text classifier may produce a list of labels or identifiers each with a corresponding probability or likelihood of correctness of assignment of the label to the user question, where there is no clear or dominant subject matter area or category label or identifier in the list. That is, it is possible that in some instances, the language content of the questions, and the context and metadata information collect at question submission does not lead to a probability or likelihood that is above a particular threshold deemed to be acceptable for distribution of the user question without human intervention. In those rare instances, the system of FIG. 13 may distribute such questions to the moderator 1350, for human intervention in assessing which support resource(s) would most likely provide the highest quality and most accurate, correct, and useful answer for the user that submitted the question.

It should be noted that, because the actual group of individuals available at any instant in time at which a question is received from a user may vary, there may be times when the estimated quality of the response from the available members of the support resources selected by the analysis provided by the text classifier 1320 and resource refinement 1330 blocks may not meet a particular minimum threshold. In such cases, a system according to the present disclosure may automatically adjust the selection of individuals to whom a question is distributed, in order to meet the minimum quality threshold. For example, the system of FIG. 13 may select to distribute the questions to particular members of the support resources, based on the stored historical performance of those members in answering questions. During processing by the resource refinement block 1330, however, it may be found that only certain members of the particular members selected to address the user questions are actually available, and that without the missing members, the estimated quality is below the acceptable or minimum level required. The system of FIG. 13 may then increase the number, or adjust the selected members of the support resource to whom the question is distributed.

Aspects of the present disclosure may be seen in a method of operating a system for directing user queries to the most suitable potential responders of an audience selected from a crowdsource population from which to request information. Such a method may be performed in a computer system having one or more processors for communicatively coupling to a user device and to memory configured to associate, in storage, a question received from the user via the user device and one or both of corresponding contextual and metadata information. Such a method may comprise storing the user question in the memory in association with corresponding contextual and metadata information; and identifying, from the question and one or both of the corresponding contextual and metadata information, one or more areas of subject matter of the user question and a probability corresponding to each of one or more areas of subject matter of the user question. The method may also comprise distributing the user question to one or more selected members of the crowdsource population, according to the one or both of the corresponding contextual and metadata information and the probability corresponding to each of one or more areas of subject matter of the user question, for preparation of one or more corresponding responses. The method may also comprise receiving the one or more responses corresponding to the user question and delivering the one or more corresponding responses to the user via the user device. The method may further comprise adjusting one or both of the identifying and the distribution, according to feedback received from the user on the one or more corresponding responses to the user question.

In various representative embodiments of the present disclosure, the one or both of corresponding contextual and metadata information may comprise a geographic location of the user, and may comprise personal information of the user stored in the memory. The distributing may comprise selecting one or more members of the crowdsource population to prepare one or more corresponding responses to the user question, according to the probability corresponding to each of the identified one or more areas of subject matter. In some representative embodiments according to the present disclosure, the selecting may comprise adjusting a number of members of the crowdsource population selected to prepare the one or more corresponding responses to the user question. The adjusting may comprise adjusting the identifying, according to feedback received on the one or more corresponding responses to the user question from members of the crowdsource population not selected to prepare the one or more corresponding responses. The adjusting may comprise adjusting the distribution, according to real-time information indicative of the availability of the individual members of the crowdsource population.

Additional aspects of the present disclosure may be found in a system for directing queries to the most suitable potential responders of an audience selected from a crowdsource population from which to request information. Such a system may comprise a computer system having one or more processors for communicatively coupling to a user device and to memory configured to associate, in storage, a question received from the user via the user device and one or both of corresponding contextual and metadata information. The one or more processors of the system may be operable to, at least, perform the steps of the method described above.

Yet other aspects of the present disclosure may be observed in a non-transitory, computer-readable medium comprising executable instructions. The executable instructions may cause a computer system having one or more processors for communicatively coupling to a user device and to memory configured to associate, in storage, a question received from the user via the user device and one or both of corresponding contextual and metadata information. The one or more processors of the a computer system may perform the steps of a method of operating a system for directing queries to the most suitable potential responders of an audience selected from a crowdsource population from which to request information, such as the steps of the method described above.

Although devices, methods, and systems according to the present disclosure may have been described in connection with a preferred embodiment, it is not intended to be limited to the specific form set forth herein, but on the contrary, it is intended to cover such alternative, modifications, and equivalents, as can be reasonably included within the scope of the disclosure as defined by this disclosure and appended diagrams.

Accordingly, embodiments in accordance with the present disclosure may be realized in hardware, software, or a combination of hardware and software. Embodiments in accordance with the present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Embodiments of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method of operating a system for directing user queries to the most suitable potential responders of an audience selected from a crowdsource population from which to request information, the method comprising:

in a computer system having text classification circuitry, resource refinement circuitry, user interface circuitry, network interface circuitry, and memory configured to associate, in storage, a question received from a user via a user device and one or both of: corresponding contextual and metadata information, wherein the metadata information can be added, via one or more tags, by the user, by a member of the crowdsource population, and by an automated tagging service, wherein the text classification circuitry, the resource refinement circuitry, the user interface circuitry, the network interface circuitry, and the memory are operable to support the system for directing user queries to the most suitable potential responders of the audience selected from the crowdsource population from which to request information;

labeling documents stored in a repository that is operatively coupled to the computer system;

training the text classification circuitry to identify particular expert groups based on labels corresponding to the labeled documents;

designating, via one or more tags, particular members of the crowdsource population as part of an expert group that is associated with one or more particular topics;

receiving location information from the user device based on a GPS signal received via GPS circuitry of the user device;

analyzing the user question via the trained text classification circuitry of the computer system, wherein the trained text classification circuitry is configured to perform a natural language analysis and analyze the user question based, in part, on the labels corresponding to the labeled documents stored in the repository;

assigning identifiers with probabilities, via the trained text classification circuitry, to the user question, wherein the trained text classification circuitry is configured to provide a corresponding probability of correctness of assignment of each of the identifiers to the user question;

storing the user question in the memory in association with corresponding contextual and metadata information;

identifying, automatically by the trained text classification circuitry, based on the question and one or both of the corresponding contextual and metadata information, one or more areas of subject matter to which the user question may relate;

generating, automatically by the trained text classification circuitry for each one of the one or more areas of subject matter, a probability that the user question relates to the one of the one or more areas of subject matter;

distributing, automatically by the resource refinement circuitry via the network interface circuitry, the user question to one or more selected members of the crowdsource population, wherein the one or more selected members of the crowdsource population are part of the expert group based on the one or more tags associated with the user question, wherein the distributing is based on the one or both of the corresponding contextual and metadata information, and based on the generated probabilities, and wherein the distributing is configurable to be based on the received location information from the user device based on the GPS signal received via the GPS circuitry of the user device;

receiving, via the network interface circuitry, one or more responses corresponding to the user question;

generating, by the user interface circuitry, a graphical user interface via which the one or more corresponding responses are presented to the user via the user device; and adjusting, by one or both of the trained text classification circuitry and the resource refinement circuitry, one or both of the identifying and the distributing, according to feedback received from the user on the one or more corresponding responses to the user question.

2. The method according to claim 1, wherein, when the metadata information is added by the automated tagging service, the automated tagging service is configured to detect an image that is part of the received question and to add, via one or more tags, metadata information identifying content in the image.

3. The method according to claim 1, wherein the one or both of corresponding contextual and metadata information comprises one or both of personal information of the user stored in the memory and a geographic location of the user.

4. The method according to claim 1, wherein the distributing comprises:

selecting, by the resource refinement circuitry based on the generated probabilities, one or more members of the crowdsource population to prepare one or more corresponding responses to the user question.

5. The method according to claim 4, wherein the selecting comprises adjusting, by the resource refinement circuitry, how many members of the crowdsource population are selected during the selecting.

6. The method according to claim 4, wherein the adjusting comprises: adjusting, by the trained text classification circuitry, the identifying, wherein: the adjusting of the identifying is based on feedback received on the one or more corresponding responses to the user question; and the feedback is from members of the crowdsource population not selected during the selecting.

7. The method according to claim 1, wherein the adjusting comprises:

adjusting, by the resource refinement circuitry, the distributing based on real-time information indicative of the availability of the individual members of the crowdsource population.

8. A system for directing queries to the most suitable potential responders of an audience selected from a crowdsource population from which to request information, the system comprising:

a computer system having text-classification circuitry, resource refinement circuitry, user interface circuitry, network interface circuitry, and memory configured to associate, in storage, a question received from a user via a user device and one or both of corresponding contextual and metadata information, wherein the text classification circuitry, the resource refinement circuitry, the user interface circuitry, the network interface circuitry, and the memory are operable to support the system for directing user queries to the most suitable potential responders of the audience selected from the crowdsource population from which to request information, wherein the metadata information can be added, via one or more tags, by the user, by a member of the crowdsource population, and by an automated tagging service, wherein the computer system designates, via one or more tags, particular members of the crowdsource population as part of an expert group that is associated with one or more particular topics, and wherein the computer system receives location information from the user device based on a GPS signal received via GPS circuitry of the user device, wherein:

the memory is configured to store the user question in the memory in association with corresponding contextual and metadata information; the text classification circuitry is configured to:

train the text classification circuitry based on documents that have been labeled and stored in a repository that is operatively coupled to the computer system, wherein the text classification circuit is trained to identify particular expert groups based on labels corresponding to the labeled documents;

analyze, by the trained text classification circuitry, the user question using a natural language analysis and the labels corresponding to the labeled documents stored in the repository;

assign identifiers with probabilities, by the trained text classification circuitry, to the user question and provide a corresponding probability of correctness of assignment of each of the identifiers to the user question;

identify, automatically by the trained text classification circuitry, based on the question and one or both of the corresponding contextual and metadata information, one or more areas of subject matter to which the user question may relate;

generate, automatically by the trained text classification circuitry, for each one of the one or more areas of subject matter, a probability that the user question relates to the one of the one or more areas of subject matter;

adjust, by the trained text classification circuitry, the identification according to feedback received from the user on the one or more corresponding responses to the user question;

the resource refinement circuitry is configured to:

distribute, automatically via the network interface circuitry, the user question to one or more selected members of the crowdsource population, wherein the one or more selected members of the crowdsource population are part of the expert group based on the one or more tags associated with the user question, wherein the distribution is based on the one or both of the corresponding contextual and metadata information, and based on the generated probabilities, and wherein the distribution is configurable to be based on the received location information from the user device based on the GPS signal received via GPS circuitry of the user device; and adjust the distribution according to feedback received from the user on the one or more corresponding responses to the user question;

the network interface circuitry is configured to receive one or more responses corresponding to the user question; and the user interface circuitry is configured to generate a graphical user interface via which the one or more corresponding responses are presented to the user via the user device.

9. The system according to claim 8, wherein, wherein, when the metadata information is added by the automated tagging service, the automated tagging service is configured to detect an image that is part of the received question and to add, via one or more tags, metadata information identifying content in the image.

10. The system according to claim 8, wherein the one or both of corresponding contextual and metadata information comprises one or both of personal information of the user stored in the memory and a geographic location of the user.

11. The system according to claim 8, wherein the distribution comprises:

selection, by the resource refinement circuitry based on the generated probabilities, of one or more members of the crowdsource population to prepare one or more corresponding responses to the user question.

12. The system according to claim 11, wherein the selecting comprises adjustment, by the resource refinement circuitry, how many members of the crowdsource population to select as part of the selection.

13. The system according to claim 11, wherein: the adjustment comprises adjustment, by the trained text classification circuitry, of the identification; the adjustment of the identification is based on feedback received on the one or more corresponding responses to the user question; and the feedback is from members of the crowdsource population not selected as part of the selection.

14. The system according to claim 8, wherein:

the adjustment comprises adjustment, by the resource refinement circuitry, of the distribution; and the adjustment of the distribution is based on real-time information indicative of the availability of the individual members of the crowdsource population.

15. A non-transitory computer-readable medium comprising executable instructions for causing a computer system having text classification circuitry, resource refinement circuitry, user interface circuitry, network interface circuitry, and memory configured to associate, in storage, a question received from a user via a user device and one or both of corresponding contextual and metadata information, to perform the steps of a method of operating a system for directing queries to the most suitable potential responders of an audience selected from a crowdsource population from which to request information, the steps comprising:

labeling documents stored in a repository that is operatively coupled to the computer system;

training the text classification circuitry to identify particular expert groups based on labels corresponding to the labeled documents;

designating, via one or more tags, particular members of the crowdsource population as part of an expert group that is associated with one or more particular topics;

receiving location information from the user device based on a GPS signal received via GPS circuitry of the user device;

analyzing the user question via the trained text classification circuitry of the computer system, wherein the trained text classification circuitry is configured to perform a natural language analysis and analyze the user question based, in part, on the labels corresponding to the labeled documents stored in the repository;

assigning identifiers with probabilities to the user question, wherein the trained text classification circuitry is configured to provide a corresponding probability of correctness of assignment of each of the identifiers to the user question;

storing the user question in the memory in association with corresponding contextual and metadata information, wherein the metadata information can be added, via one or more tags, by the user, by a member of the crowdsource population, and by an automated tagging service;

identifying, automatically by the trained text classification circuitry, based on the question and one or both of the corresponding contextual and metadata information, one or more areas of subject matter to which the user question may relate;

generating, automatically by the trained text classification circuitry for each one of the one or more areas of subject matter, a probability that the user question relates to the one of the one or more areas of subject matter;

distributing, automatically by the resource refinement circuitry via the network interface circuitry, the user question to one or more selected members of the crowdsource population, wherein the one or more selected members of the crowdsource population are part of the expert group based on the one or more tags associated with the user question, wherein the distributing is based on the one or both of the corresponding contextual and metadata information, and based on the generated probabilities, and wherein the distributing is configurable to be based on the received location information from the user device based on the GPS signal received via GPS circuitry of the user device;

receiving, via the network interface circuitry, one or more responses corresponding to the user question;

generating, by the user interface circuitry, a graphical user interface via which the one or more corresponding responses are presented to the user via the user device; and adjusting, by one or both of the trained text classification circuitry and the resource refinement circuitry, one or both of the identifying and the distributing, according to feedback received from the user on the one or more corresponding responses to the user question.

16. The non-transitory computer-readable medium according to claim 15, wherein the one or both of corresponding contextual and metadata information comprises one or both of a geographic location of the user and personal information of the user stored in the memory.

17. The non-transitory computer-readable medium according to claim 15, wherein the steps comprise:

analyzing one or both of an Internet-based location and a GPS-based location information related to the user who submitted the user question, wherein one or both of the Internet-based location and the GPS-based location information are provided by circuitry of the user device;

determining, based on one or both of the Internet-based location and the GPS-based geographic information from the user device, an answer quality of one or more responses from the one or more selected members of the crowdsource population; and adjusting one or both of the identifying and the distribution, according to the answer quality and the feedback received from the user on the one or more corresponding responses to the user question.

18. The non-transitory computer-readable medium according to claim 15, wherein the distributing comprises:

selecting, by the resource refinement circuitry based on the generated probabilities, one or more members of the crowdsource population to prepare one or more corresponding responses to the user question.

19. The non-transitory computer-readable medium according to claim 18, wherein the selecting comprises adjusting, by the resource refinement circuitry, how many members of the crowdsource population are selected during the selecting.

20. The non-transitory computer-readable medium according to claim 18, wherein the adjusting comprises: adjusting, by the trained text classification circuitry, the identifying, wherein: the adjusting of the identifying is based on feedback received on the one or more corresponding responses to the user question; and the feedback is from members of the crowdsource population not selected during the selecting.

21. The non-transitory computer-readable medium according to claim 15, wherein the adjusting comprises:

adjusting, by the resource refinement circuitry, the distributing—based on real-time information indicative of the availability of the individual members of the crowdsource population.

* * * * *